(12) United States Patent
Hasegawa

(10) Patent No.: US 11,400,693 B2
(45) Date of Patent: Aug. 2, 2022

(54) WEATHER RESISTANCE IMPROVER, RESIN COMPOSITION FOR COATING METAL-NANOWIRE LAYER, AND METAL NANOWIRE-CONTAINING LAMINATE

(71) Applicant: SEIKO PMC CORPORATION, Tokyo (JP)

(72) Inventor: Toshiyuki Hasegawa, Ichihara (JP)

(73) Assignee: SEIKO PMC CORPORATION, Tokyo (JP)

(*) Notice: Subject to any disclaimer, the term of this patent is extended or adjusted under 35 U.S.C. 154(b) by 537 days.

(21) Appl. No.: 16/469,342

(22) PCT Filed: Jun. 9, 2017

(86) PCT No.: PCT/JP2017/021427
§ 371 (c)(1),
(2) Date: Jun. 13, 2019

(87) PCT Pub. No.: WO2018/116501
PCT Pub. Date: Jun. 28, 2018

(65) Prior Publication Data
US 2019/0299575 A1     Oct. 3, 2019

(30) Foreign Application Priority Data

Dec. 20, 2016 (JP) .............. JP2016-246587

(51) Int. Cl.

| | | |
|---|---|---|
| *B32B 15/02* | (2006.01) | |
| *B32B 17/10* | (2006.01) | |
| *B32B 27/18* | (2006.01) | |
| *B32B 27/08* | (2006.01) | |
| *B32B 27/36* | (2006.01) | |
| *B32B 27/06* | (2006.01) | |
| *B32B 27/32* | (2006.01) | |
| *C08F 2/44* | (2006.01) | |
| *C08K 5/47* | (2006.01) | |
| *C08L 67/00* | (2006.01) | |
| *H01B 1/22* | (2006.01) | |
| *C09D 5/00* | (2006.01) | |
| *C09D 167/00* | (2006.01) | |
| *C09D 133/08* | (2006.01) | |
| *C09D 7/63* | (2018.01) | |
| *C09D 4/00* | (2006.01) | |
| *C09D 7/40* | (2018.01) | |
| *B32B 27/28* | (2006.01) | |
| *C08K 5/5313* | (2006.01) | |

(Continued)

(52) U.S. Cl.
CPC ............ *B32B 27/281* (2013.01); *B32B 15/02* (2013.01); *B32B 17/10* (2013.01); *B32B 27/08* (2013.01); *B32B 27/18* (2013.01); *B32B 27/36* (2013.01); *C08F 2/44* (2013.01); *C08K 5/47* (2013.01); *C08K 5/5313* (2013.01); *C08K 5/5317* (2013.01); *C08K 5/5377* (2013.01); *C08L 67/00* (2013.01); *C09D 5/00* (2013.01); *C09D 167/00* (2013.01); *H01B 1/22* (2013.01); *B32B 2260/023* (2013.01); *B32B 2264/104* (2013.01); *B32B 2305/72* (2013.01); *B32B 2307/202* (2013.01)

(58) Field of Classification Search
None
See application file for complete search history.

(56) References Cited

U.S. PATENT DOCUMENTS

| | | | |
|---|---|---|---|
| 2004/0035498 A1* | 2/2004 | Kinlen | .................. C09D 5/082 148/250 |
| 2007/0074316 A1 | 3/2007 | Alden | |
| 2008/0216705 A1 | 9/2008 | Hayes | |

(Continued)

FOREIGN PATENT DOCUMENTS

| | | |
|---|---|---|
| CA | 2491359 A1 | 12/2003 |
| CN | 105142804 A | 12/2015 |

(Continued)

OTHER PUBLICATIONS

Korean Office Action (KROA) dated Oct. 30, 2020 issued in the corresponding Korean Patent Application No. 10-2019-7018148 and its English machine translation.

(Continued)

*Primary Examiner* — Sheeba Ahmed
(74) *Attorney, Agent, or Firm* — Rankin, Hill & Clark LLP

(57) ABSTRACT

The present disclosure relates to a weather resistance improver including a compound (A) and a compound (B), wherein the compound (A) is a compound having the following structure (1), and the compound (B) is a compound having the following structure (2) or a salt thereof. According to the weather resistance improver, it is possible to suppress deterioration of a transparent conductive film using metal nanowires even under any conditions of long-term exposure to sunlight, long-term exposure to artificial light, and high-temperature/high-humidity.

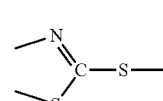

Structure (1)

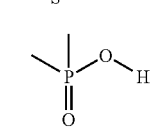

Structure (2)

20 Claims, 1 Drawing Sheet

(51) Int. Cl.
*C08K 5/5317* (2006.01)
*C08K 5/5377* (2006.01)

(56) References Cited

U.S. PATENT DOCUMENTS

| | | |
|---|---|---|
| 2008/0272341 A1 | 11/2008 | Kinlen |
| 2010/0264378 A1* | 10/2010 | Naoi ............... H01L 31/022483 |
| | | 252/514 |
| 2011/0021676 A1 | 1/2011 | Hoerold et al. |
| 2012/0183768 A1 | 7/2012 | Kondo |
| 2012/0255762 A1 | 10/2012 | Katagiri et al. |
| 2014/0170427 A1 | 6/2014 | Philip, Jr. |
| 2014/0272392 A1 | 9/2014 | Fitz et al. |
| 2015/0270024 A1 | 9/2015 | Allemand |
| 2016/0118156 A1 | 4/2016 | Kawaguchi |
| 2016/0216790 A1 | 7/2016 | Ebihara |

FOREIGN PATENT DOCUMENTS

| | | |
|---|---|---|
| CN | 105331240 A | 2/2016 |
| GB | 1519303 A | 7/1978 |
| JP | S51065045 A | 6/1976 |
| JP | H01240579 A | 9/1989 |
| JP | H03215574 A2 | 9/1991 |
| JP | H09241532 A | 9/1997 |
| JP | H09324324 A | 12/1997 |
| JP | 2001335955 A | 12/2001 |
| JP | 2003238901 A | 8/2003 |
| JP | 2005528485 A | 9/2005 |
| JP | 2005317395 A | 11/2005 |
| JP | 2010521582 A | 6/2010 |
| JP | 2011-513540 A | 4/2011 |
| JP | 2013016455 A | 1/2013 |
| JP | 2016001608 A | 1/2016 |
| JP | 2016508892 A | 3/2016 |
| KR | 1020120110126 A | 10/2012 |
| WO | 2014196354 A1 | 12/2014 |

OTHER PUBLICATIONS

Japanese Office Action dated Jun. 4, 2019 for the corresponding Japanese Patent Application No. 2018-557520; Machine translation.
Chinese Office Action (CNOA) dated Nov. 4, 2020 for corresponding Chinese Patent Application No. 201780076745.8 and its English machine translation.
International Search Report dated Aug. 8, 2017 filed in PCT/JP2017/021427.

* cited by examiner (A)
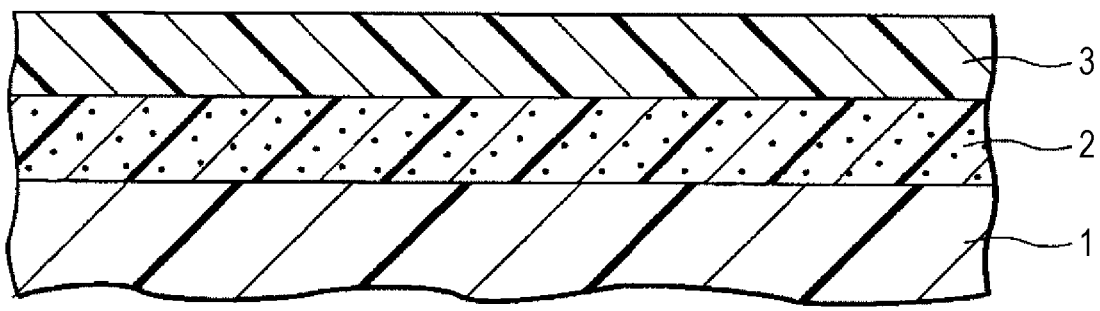
(B)
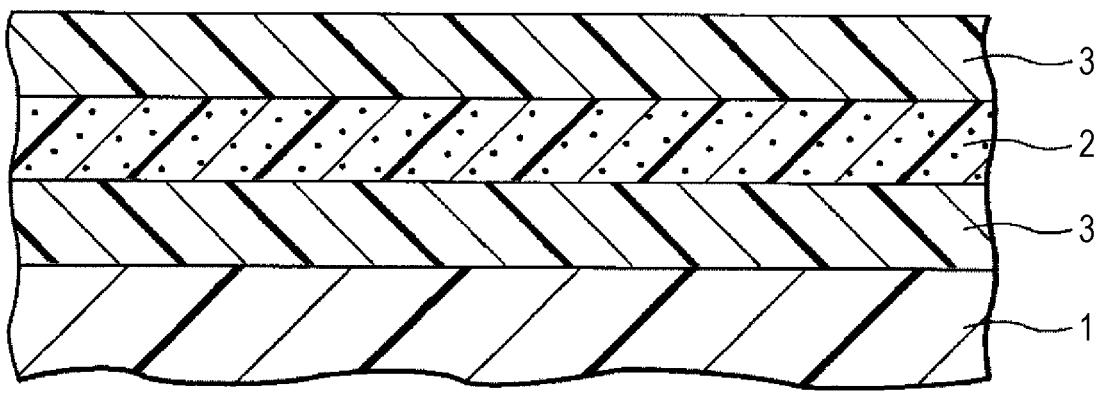
1 SUBSTRATE
2 METAL NANOWIRE-CONTAINING LAYER
3 PROTECTIVE LAYER

WEATHER RESISTANCE IMPROVER, RESIN COMPOSITION FOR COATING METAL-NANOWIRE LAYER, AND METAL NANOWIRE-CONTAINING LAMINATE

TECHNICAL FIELD

The present invention relates to a weather resistance improver, and particularly to the weather resistance improver capable of improving weather resistance by using it in a transparent conductive film using metal nanowires. The present invention also relates to a resin composition for coating a metal nanowire-containing layer containing the weather resistance improver of the present invention, and a metal nanowire-containing laminate.

BACKGROUND ART

In recent years, use of display devices such as liquid crystal displays, plasma displays, organic electroluminescent displays, electronic papers, input sensors such as touch panels, solar cells using solar light such as thin film amorphous silicon solar cells and dye-sensitized solar cells, and the like is increasing. Along with this, demand for the transparent conductive film which is a vital component for these devices is also increasing.

Since a diameter of the metal nanowire is as small as nano-order, optical transparency in a visible light region is high, and application as the transparent conductive film to replace ITO (indium tin oxide) is expected. Among them, the transparent conductive film using silver nanowires having high conductivity have been proposed (for example, see Patent Literatures 1, 2 and 3).

Since the transparent conductive film is used for applications such as the liquid crystal display and the input sensor such as the touch panel described above, its use environment is not limited to indoor or outdoor, and it is also contemplated to be used under light sources such as sunlight, fluorescent light or LED light for a long time, and used under high temperature and high humidity conditions. Two stabilities of photostability maintaining surface resistivity under long-term exposure conditions of light and high-temperature/high-humidity stability maintaining the surface resistivity under high temperature and high humidity conditions are simultaneously required for the transparent conductive film using the metal nanowires. On the other hand, since the metal nanowire tends to lose conductivity in both environments, the weather resistance improver to exhibit both the photostability and the high-temperature/high-humidity is required.

With regard to the photostability, it is required for the transparent conductive film using the metal nanowires to have the photostability of an irradiated portion exposed to sunlight, and the photostability is also required in a boundary portion between the irradiated portion and a shielded portion where sunlight is blocked by a shielding material, however, it has been reported that the conductivity can be particularly deteriorated in the boundary portion (for example, see Patent Literatures 4 and 5). In Patent Literature 4, transition metal salts and transition metal complexes are described as effective light stabilizers in the boundary portion. Further, in Patent Literature 5, metal particles, metal oxide particles, and a metal complex compound are described as the effective light stabilizers in the boundary portion. However, Patent Literatures 4 and 5 do not describe the high-temperature/high-humidity stability. Further, since these compounds containing metals have a problem of coloration, the problem of promoting gelation of polymerizable monomers and macromonomers used simultaneously, and the problem of precipitation and migration, the weather resistance improver not containing metal is considered to be preferred. In Patent Literature 6, durability under the fluorescent light is obtained by using an organic acid having a specific pKa value, however, a period in which the durability is maintained is still not satisfactory at two months at low illuminance, and there is no description on the durability under high humidity conditions.

CITATION LIST

Patent Literature

Patent Literature 1: JP-A-09-324324
Patent Literature 2: JP-A-2005-317395
Patent Literature 3: U. S. Patent Application Publication No. 2007/0074316
Patent Literature 4: U. S. Patent Application Publication No. 2015/0270024
Patent Literature 5: JP-A-2016-001608
Patent Literature 6: JP-T-2016-508892

SUMMARY OF THE INVENTION

Problems to be Solved by the Invention

An object of the present invention is to provide the weather resistance improver capable of suppressing deterioration of the transparent conductive film using the metal nanowires even under any conditions of long-term exposure to sunlight, long-term exposure to artificial light, and high-temperature/high-humidity.

Solution to the Problems

As a result of extensive studies to solve the above problems, the present inventors have found that when the weather resistance improver including a combination of specific compounds is used, it is possible to suppress deterioration of the transparent conductive film using the metal nanowires even under any conditions of long-term exposure to sunlight, long-term exposure to artificial light, and high-temperature/high-humidity, and the present invention has been completed.

That is, the present invention relates to the following invention.

(i) A weather resistance improver including a compound (A) and a compound (B), in which
the compound (A) is a compound having the following structure (1), and
the compound (B) is a compound having the following structure (2) or a salt thereof.

[Chemical formula 1]

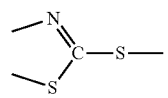

Structure (1)

[Chemical formula 2]

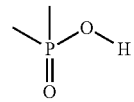

Structure (2)

(ii) The weather resistance improver according (i), including:

the compound (A); and the compound (B) in which at least one hydroxy group is bonded to one phosphorus atom, in which the compound (A) is a compound represented by the following general formula (1) and/or (2), and the compound (B) is at least one selected from phytic acid, compounds represented by the following general formulas (3), (4), (5) and (6), and salts thereof.

General formula (1)

[Chemical formula 3]

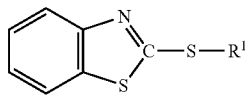

(1)

(where, in the general formula (1), $R^1$ represents a hydrogen atom, an alkyl group of 1 to 8 carbon atoms or a (di) carboxyalkyl group having an alkyl group of 1 to 3 carbon atoms)

General formula (2)

[Chemical formula 4]

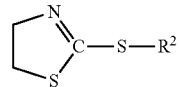

(2)

(where, in the general formula (2), $R^2$ represents a hydrogen atom, an alkyl group of 1 to 8 carbon atoms or a (di) carboxyalkyl group having an alkyl group of 1 to 3 carbon atoms)

General formula (3)

[Chemical formula 5]

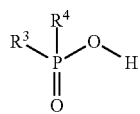

(3)

(where, in the general formula (3), $R^3$ and $R^4$ each represents a hydrogen atom, or an alkyl group, an arylalkyl group, a hydroxyalkyl group, an alkoxyalkyl group, a carboxyalkyl group, an aminoalkyl group, in which an alkyl moiety has 1 to 8 carbon atoms, or an alkenyl group, an aryl group, a hydroxyaryl group or an alkoxyaryl group, and $R^3$ and $R^4$ may be the same or different)

General formula (4)

[Chemical formula 6]

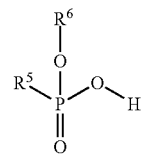

(4)

(where, in the general formula (4), $R^5$ is a hydrogen atom, or an alkyl group, an arylalkyl group, a hydroxyalkyl group, an alkoxyalkyl group, a carboxyalkyl group, an aminoalkyl group, in which an alkyl moiety has 1 to 8 carbon atoms, or a vinyl group, an aryl group, an arylalkenyl group, a hydroxyaryl group, an alkoxyaryl group or a carboxyalkyl group, and $R^6$ represents a hydrogen atom, or an alkyl group, an arylalkyl group, a hydroxyalkyl group, an alkoxyalkyl group, a carboxyalkyl group, an aminoalkyl group, a perfluoroalkyl group, in which an alkyl moiety has 1 to 8 carbon atoms, or an aryl group, a hydroxyaryl group, an alkoxyaryl group or a carboxyaryl group, and $R^5$ and $R^6$ may be the same or different)

General formula (5)

[Chemical formula 7]

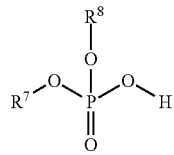

(5)

(where, in the general formula (5), $R^7$ and $R^8$ each represents a hydrogen atom, or an alkyl group, an arylalkyl group, a hydroxyalkyl group, an alkoxyalkyl group, a carboxyalkyl group, an aminoalkyl group, in which an alkyl moiety has 1 to 8 carbon atoms, or an aryl group, a hydroxyaryl group, alkoxyaryl group, carboxyaryl group or (meth)acryloyloxyalkyl group, and $R^7$ and $R^8$ may be the same or different)

General formula (6)

[Chemical formula 8]

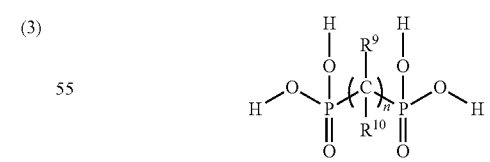

(6)

(where, in the general formula (6), $R^9$ represents a hydrogen atom or a hydroxy group, $R^{10}$ represents a hydrogen atom, an alkyl group or an aminoalkyl group of 1 to 5 carbon atoms, and n represents 1 to 12)

(iii) The weather resistance improver according to (i) or (ii), which is for metal nanowires.

(iv) The weather resistance improver according to (iii), in which the metal nanowires are silver nanowires.

(v) The weather resistance improver according to (i) or (ii), in which the compound (A) is at least one selected from 2-mercaptothiazoline, 3-(2-benzothiazol-2-ylthio)propionic acid, and (1,3-benzothiazol-2-ylthio)succinic acid.

(vi) The weather resistance improver according to (i) or (ii), in which the compound (B) is at least one selected from phosphinic acid, and dialkylphosphinic acid having 1 to 8 carbon atoms, (2-carboxyethyl) phenylphosphinic acid, phenylphosphinic acid, diphenylphosphinic acid, bis(4-methoxyphenyl) phosphinic acid, methylphenylphosphinic acid and phenylvinylphosphinic acid.

(vii) A resin composition for coating a metal nanowire-containing layer, containing the weather resistance improver according to any one of (i) to (vi), a photopolymerization initiator and/or a thermal polymerization initiator, and polymerizable monomers and/or macromonomers.

(viii) The resin composition for coating the metal nanowire-containing layer according to (vii), containing at least one compound (A) of 0.3 to 4 mass %, and at least one compound (B) of 0.03 to 0.6 mmol/g as an amount of phosphorus atom with respect to the polymerizable monomers and/or macromonomers.

(ix) A metal nanowire-containing laminate alternately including: a metal nanowire-containing layer; and a protective layer disposed on the metal nanowire-containing layer and for protecting the metal nanowire-containing layer, in which the weather resistance improver according to any one of (i) to (vi) is contained only in the protective layer, or in both the protective layer and the metal nanowire-containing layer, and the protective layer is a cured product of a resin composition for coating a metal nanowire-containing layer, which further satisfies the following conditions:
(1) containing a photopolymerization initiator and/or a thermal polymerization initiator, and polymerizable monomers and/or macromonomers;
(2) containing at least one compound (A) of 0.3 to 4 mass % with respect to the polymerizable monomers and/or macromonomers; and
(3) containing at least one compound (B) of 0.03 to 0.6 mmol/g as an amount of phosphorus atom with respect to the polymerizable monomers and/or macromonomers.

(x) The metal nanowire-containing laminate according to (ix), in which the metal nanowire-containing layer contains an aqueous polyester resin.

Effects of the Invention

According to the present invention, it is possible to provide the weather resistance improver capable of suppressing deterioration of the transparent conductive film using the metal nanowires even under any conditions of long-term exposure to sunlight, long-term exposure to artificial light, and high-temperature/high-humidity.

BRIEF DESCRIPTION OF THE DRAWINGS

FIGS. 1A and 1B are diagrams showing an embodiment of a metal nanowire-containing laminate.

DESCRIPTION OF THE EMBODIMENTS

The present invention will be described in detail below.
[Weather Resistance Improver]
A weather resistance improver in the present invention contains a compound (A) and a compound (B). It is necessary to use the compound (A) and the compound (B) in combination in order to suppress deterioration of metal nanowire under conditions of long-term exposure to sunlight, long-term exposure to artificial light, and high-temperature/high-humidity. This effect is an effect unique to the present invention that weather resistance, which is insufficient only by using the compound (A) or the compound (B) alone, can be maintained for a long period of time.
[Compound (A)]

The compound (A) is a compound having the following structure (1),

[Chemical formula 9]

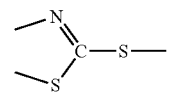

Structure (1)

and is preferably a compound represented by the following general formula (1) or (2). They can be used alone or in combination of two or more.

General formula (1)

[Chemical formula 10]

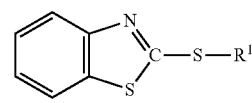

(1)

(where, in the general formula (1), $R^1$ represents a hydrogen atom, an alkyl group of 1 to 12 carbon atoms or a (di) carboxyalkyl group having an alkyl group of 1 to 3 carbon atoms)

General formula (2)

[Chemical formula 11]

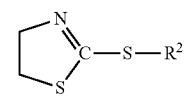

(2)

(where, in the general formula (2), $R^2$ represents a hydrogen atom, an alkyl group of 1 to 12 carbon atoms or a (di) carboxyalkyl group having an alkyl group of 1 to 3 carbon atoms)

Alkyl groups having 1 to 12 carbon atoms of the $R^1$ or $R^2$ includes, for example, methyl group, ethyl group, n-propyl group, isopropyl group, n-butyl group, isobutyl group, sec-butyl group, tert-butyl group, isoamyl group, hexyl group, octyl group, dodecyl group and the like. (Di)carboxyalkyl groups containing an alkyl group of 1 to 3 carbon atoms of the $R^1$ or $R^2$ include, for example, carboxymethyl group, 1-carboxyethyl group, 2-carboxyethyl group, 1,2-dicarboxyethyl group, 3-carboxypropyl group, and 1,3-dicarboxypropyl group.

Specific examples of the compound (A) include 2-mercaptothiazoline, 2-mercaptothiazoline methyl ether, 2-mercaptobenzothiazole, 2-mercaptobenzothiazole methyl ether, 2-mercaptobenzothiazole ethyl ether, 2-mercaptobenzothiazole propyl ether, 2-mercaptobenzothiazole butyl ether, 2-mercaptobenzothiazole isobutyl ether, 2-mercaptobenzothiazole dodecyl ether, (1,3-benzothiazol-2-ylthio) acetic acid, 2-(1,3-benzothiazole-2-ylthio) propionic acid, 3-(1,3-benzothiazol-2-ylthio) propionic acid, (1,3-benzothiazol-2-ylthio) succinic acid and the like.

Among them, from the viewpoint of weather resistance, 2-mercaptothiazoline, 2-mercaptobenzothiazole, 2-mercaptobenzothiazole methyl ether, 3-(1,3-benzothiazol-2-ylthio) propionic acid, and (1,3-benzothiazol-2-ylthio) succinic acid are preferred, and 2-mercaptothiazoline, 3-(1,3-benzothiazol-2-ylthio) propionic acid, and (1,3-benzothiazol-2-ylthio) succinic acid are particularly preferred. They can be used alone or in combination of two or more.

[Compound (B)]

The compound (B) is a compound having the following structure (2) or a salt thereof,

[Chemical formula 2]

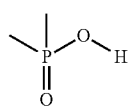

Structure (2)

and is preferably at least one compound selected from phytic acid, compounds represented by the following general formulas (3), (4), (5) and (6), and salts thereof, in which at least one hydroxy group is bonded to one phosphorus atom.

General formula (3)

[Chemical formula 13]

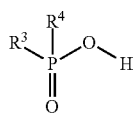

(3)

(where, in the general formula (3), $R^3$ and $R^4$ each represents a hydrogen atom, or an alkyl group, an arylalkyl group, a hydroxyalkyl group, an alkoxyalkyl group, a carboxyalkyl group, an aminoalkyl group, in which an alkyl moiety has 1 to 12 carbon atoms, or an alkenyl group, an aryl group, a hydroxyaryl group or an alkoxyaryl group, and $R^3$ and $R^4$ may be the same or different)

General formula (4)

[Chemical formula 14]

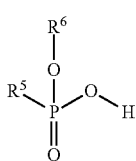

(4)

(where, in the general formula (4), $R^5$ is a hydrogen atom, or an alkyl group, an arylalkyl group, a hydroxyalkyl group, an alkoxyalkyl group, a carboxyalkyl group, an aminoalkyl group, in which an alkyl moiety has 1 to 12 carbon atoms, or a vinyl group, an aryl group, an arylalkenyl group, a hydroxyaryl group, an alkoxyaryl group or a carboxyalkyl group, and $R^6$ represents a hydrogen atom, or an alkyl group, an arylalkyl group, a hydroxyalkyl group, an alkoxyalkyl group, a carboxyalkyl group, an aminoalkyl group, a perfluoroalkyl group, in which an alkyl moiety has 1 to 12 carbon atoms, or an aryl group, a hydroxyaryl group, an alkoxyaryl group or a carboxyaryl group)

General formula (5)

[Chemical formula 15]

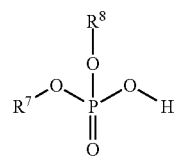

(5)

(where, in the general formula (5), $R^7$ and $R^8$ each represents a hydrogen atom, or an alkyl group, an arylalkyl group, a hydroxyalkyl group, an alkoxyalkyl group, a carboxyalkyl group, an aminoalkyl group, in which an alkyl moiety has 1 to 12 carbon atoms, or an aryl group, a hydroxyaryl group, alkoxyaryl group, carboxyaryl group or (meth)acryloyloxyalkyl group, and $R^7$ and $R^8$ may be the same or different)

General formula (6)

[Chemical formula 16]

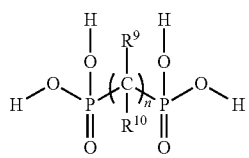

(6)

(where, in the general formula (6), $R^9$ represents a hydrogen atom or a hydroxy group, $R^{10}$ represents a hydrogen atom, an alkyl group or an aminoalkyl group of 1 to 5 carbon atoms, and n represents 1 to 12)

They can be used alone or in combination of two or more.

Specific examples of the compound (B) include phytic acid, phosphinic acid, phosphonic acid, phosphoric acid, methyl phosphinic acid, dimethyl phosphinic acid, phenyl phosphinic acid, diphenyl phosphinic acid, methyl phenyl phosphinic acid, (1-methyl-heptyl) phenylphosphinic acid, (2-methoxyphenyl) phenylphosphinic acid, phenyl-o-tolylphosphinic acid, phenylvinylphosphinic acid, bis(hydroxymethyl) phosphinic acid, bis(4-methoxyphenyl) phosphinic acid, diisooctylphosphinic acid, (2-carboxyethyl) phenylphosphinic acid, methylphosphonic acid, ethylphosphonic acid, propylphosphonic acid, hexylphosphonic acid, octylphosphonic acid, decylphosphonic acid, dodecylphosphonic acid, phenylphosphonic acid, vinylphosphonic acid, (4-hydroxybenzyl) phosphonic acid, benzhydryl phosphonic acid, cinnamyl phosphonic acid, (1-aminomethyl) phosphonic acid, ethyl methylphosphonate, isopropyl methylphosphonate, 6-phosphonohexanoic acid, methyl phosphate, isopropyl phosphate, dimethyl phosphate, diisopropyl phosphate, phenyl phosphate, diphenyl phosphate, etidronic acid, (6-phosphonohexyl) phosphonic acid, (12-phosphonododecyl) phosphonic acid, alendronic acid, 2-((meth) acryloyloxy) ethyl phosphate, bis[2-((meth)acryloyloxy) ethyl] phosphate, acid phosphoxy polyethylene glycol mono (meth)acrylate or acid phosphoxy polypropylene glycol mono(meth)acrylate, nonafluorohexyl phosphonic acid, and the like. They can be used alone or in combination of two or more. Among them, phosphinic acids represented by the general formula (3) are preferred, such as phosphinic acid, methyl phosphinic acid, dimethyl phosphinic acid, phenyl phosphinic acid, diphenyl phosphinic acid, methyl phenyl phosphinic acid, (1-methyl-heptyl) phenyl phosphinic acid, (2-methoxyphenyl) phenylphosphinic acid, phenyl-o-tolylphosphinic acid, phenylvinylphosphinic acid, bis(hydroxymethyl) phosphinic acid, bis(4-methoxyphenyl) phosphinic acid, diisooctylphosphinic acid, and (2-carboxyethyl) phenylphosphinic acid.

Further, a part of the compound (B) may be a salt of a neutralizing agent such as an alkali metal, ammonia, or an amine. An amount of the neutralizing agent is preferably 0.5 equivalents or less, more preferably 0.2 equivalents or less based on an atomic group represented by P—OH. When it is in this range, the weather resistance is well developed.

In the present invention, the weather resistance improver does not have to be a mixture of the compounds (A) and (B) in advance, but may be finally contained in a material to be improved in weather resistance. Content of the compound (A) is preferably 0.3 to 4 mass %, more preferably 0.5 to 3 mass %, and still more preferably 0.7 to 2.5 mass % with respect to polymerizable monomers and/or macromonomers. Content of the compound (B) is preferably 0.03 to 0.6 mmol/g, more preferably 0.06 to 0.5 mmol/g, and still more preferably 0.07 to 0.4 mmol/g as an amount of phosphorus atom. When it is in this range, the weather resistance is well developed.

[Metal Nanowire-Containing Laminate]

A metal nanowire-containing laminate is formed on a substrate. The metal nanowire-containing laminate is a laminate having at least one metal nanowire-containing layer obtained by film-forming a metal nanowire-containing composition, and at least one protective layer obtained by film-forming a resin composition for coating the metal nanowire-containing layer, disposed on the metal nanowire-containing layer and for protecting the metal nanowire-containing layer. A position of the protective layer is not particularly limited if it is provided on the metal nanowire-containing layer, and the protective layer can be, for example, disposed on one or both of a first main surface side and a second main surface side of the metal nanowire-containing layer. Specifically, the protective layer can be disposed on the first main surface of the metal nanowire-containing layer as shown in FIG. 1A, or can be disposed on both surfaces of the first and second main surfaces of the metal nanowire-containing layer as shown to FIG. 1B. From the viewpoint of protecting the metal nanowire-containing layer, the protective layer is preferably disposed at least on the first main surface of the metal nanowire-containing layer.

Although an example in which the metal nanowire-containing layer and the protective layer are in contact with each other has been described above, it does not matter whether the protective layer is in contact with the metal nanowire-containing layer. Therefore, another layer may be interposed between the metal nanowire-containing layer and the protective layer.

The protective layer and the metal nanowire-containing layer are preferably arranged adjacent to each other, and more preferably, the protective layer and the metal nanowire-containing layer are arranged in contact with each other. It is because the protective layer (weather resistance improver) transfers to a metal nanowire layer, and the weather resistance is improved.

As an embodiment of the metal nanowire-containing laminate, the metal nanowire-containing laminate includes: a metal nanowire-containing layer; and a protective layer disposed on the metal nanowire-containing layer and for protecting the metal nanowire-containing layer, in which the weather resistance improver described above is contained only in the protective layer, or in both the protective layer and the metal nanowire-containing layer, and the protective layer is a cured product of a resin composition for coating a metal nanowire-containing layer, which further satisfies the following conditions.

(1) The protective layer contains a photopolymerization initiator and/or a thermal polymerization initiator, and polymerizable monomers and/or macromonomers.

(2) The protective layer contains at least one compound (A) of 0.3 to 4 mass % with respect to the polymerizable monomers and/or macromonomers.

(3) The protective layer contains at least one compound (B) of 0.03 to 0.6 mmol/g as an amount of phosphorus atom with respect to the polymerizable monomers and/or macromonomers.

In this case, the metal nanowire-containing layer preferably contains an aqueous polyester resin.

[Substrate]

The substrate may be appropriately selected depending on application, and may be rigid or flexible. Further, it may be colored. The substrate in the present invention can be used without particular limitation as long as it is obtained by a known method or is a commercially available substrate. Specific examples of materials of the substrate include glass, polyimide, polycarbonate, polyether sulfone, polyacrylate, polyester, polyethylene terephthalate, polyethylene naphthalate, polyolefin and polyvinyl chloride. An organic functional material and an inorganic functional material may be further formed on the substrate. Further, a large number of substrates may be stacked.

[Metal Nanowire-Containing Composition]

The metal nanowire-containing composition is a composition containing metal nanowires, a binder, and a metal nanowire dispersion medium, and further containing the weather resistance improver and other additives described below, as needed.

[Metal Nanowire]

In the present invention, the metal nanowire is a wire-like metal structure having a cross-sectional diameter of nano level of less than 1 μm and an aspect ratio (long axis length/diameter) of 10 or more.

The diameter of the metal nanowire is preferably 5 nm or more and less than 250 nm, and more preferably 10 nm or more and less than 150 nm. If the diameter is within this range, it is excellent in transparency of a conductive film.

The long axis length of the metal nanowires is preferably 0.5 μm or more and 500 μm or less, and more preferably 2.5 μm or more and 100 μm or less. If the long axis length is within this range, it is excellent in dispersibility of the metal nanowire, and is excellent in conductivity and transparency when used in a transparent conductive film.

Metal species of the metal nanowire is not particularly limited. Specific examples of the metal species include gold, silver, copper, platinum and alloys of these metals. Silver is generally preferred in consideration of performance, ease of manufacture, cost and the like. The silver nanowire obtained by well-known manufacturing methods can be used. In the present invention, particularly preferred is the silver nanowire obtained by a manufacturing method including a step of reacting a silver compound in a polyol at 25 to 180° C. using an N-substituted acrylamide-containing polymer as a wire growth control agent.

[Binder]

Examples of the binder include polysaccharide, aqueous polyester resin, aqueous polyurethane resin, aqueous acrylic resin, aqueous epoxy resin and the like. These resins can be used alone or in combination of two or more, and a combination of the polysaccharide and the aqueous polyester resin is preferred.

[Polysaccharides]

Polysaccharides refer to polysaccharides and their derivatives. Specific examples of the polysaccharides include starch, pullulan, guar gum, xanthan gum, cellulose, chitosan, locust bean gum, and their enzymatic degradation products. Further, specific examples of the polysaccharide derivatives include: derivatives of partially etherified polysaccharides in which at least one of alkyl groups such as methyl, ethyl and propyl, hydroxyalkyl groups such as hydroxyethyl, hydroxypropyl and hydroxybutyl, carboxyalkyl groups such as carboxymethyl and carboxyethyl, and metal salts thereof is introduced into the polysaccharides; and derivatives of polysaccharides or derivatives of partially etherified polysaccharides obtained by graft-polymerizing (meth)acrylic acid esters to the derivatives of polysaccharides or partially etherified polysaccharides. They can be used alone or in combination of two or more. Preferred are guar gum, xanthan gum, hydroxypropyl guar gum, hydroxypropyl xanthan gum methylcellulose, hydroxypropyl methylcellulose, hydroxyethyl methylcellulose, and (meth)acrylic acid ester graft polymers thereof or (meth)acrylamides graft copolymers thereof.

[Aqueous Polyester Resin]

The aqueous polyester resin may be any polyester resin which can be dissolved or dispersed in an aqueous solvent or an aqueous dispersion medium. Specific examples of the aqueous polyester resin include polycondensates of a polyvalent carboxylic acid or its ester-forming derivative and a polyol or its ester-forming derivative. The aqueous polyester resins also include derivatives of the aqueous polyester resins. Specific examples of the derivatives of the aqueous polyester resin include (meth)acrylic modified aqueous polyester resins obtained by graft-polymerizing (meth) acrylic acid ester to aqueous polyester. They can be used alone or in combination of two or more.

The above-mentioned polyvalent carboxylic acids may be compounds having two or more carboxylic acid groups, and specifically include: aromatic dicarboxylic acids such as phthalic acid, terephthalic acid, isophthalic acid, naphthalic acid, 1,2-naphthalenedicarboxylic acid, 1,4-naphthalenedicarboxylic acid, 1,5-naphthalenedicarboxylic acid, 2,6-naphthalenedicarboxylic acid, biphenyldicarboxylic acid, orthophthalic acid; linear, branched or alicyclic aliphatic dicarboxylic acids such as oxalic acid, malonic acid, succinic acid, glutaric acid, adipic acid, pimelic acid, 2,2-dimethyl glutaric acid, suberic acid, azelaic acid, sebacic acid, dodecanedicarboxylic acid, 1,3-cyclopentanedicarboxylic acid, 1,4-cyclohexanedicarboxylic acid, diglycolic acid; tricarboxylic acids such as trimellitic acid, trimesic acid and pyromellitic acid; and metal sulfonate group-containing dicarboxylic acids such as sulfoterephthalic acid, 5-sulfoisophthalic acid, 4-sulfoisophthalic acid, 2-sulfoisophthalic acid, 4-sulfonaphthalene-2,7-dicarboxylic acid, and alkali metal salts thereof. The ester-forming derivatives of polyvalent carboxylic acids include derivatives such as anhydrides, esters, acid chlorides, halides of polyvalent carboxylic acids. They can be used alone or in combination of two or more.

The above-mentioned polyols may be compounds having two or more hydroxyl groups, and specifically include: polyethylene glycols such as ethylene glycol, diethylene glycol, triethylene glycol, tetraethylene glycol, pentaethylene glycol, hexaethylene glycol, heptaethylene glycol and octaethylene glycol; polypropylene glycols such as propylene glycol, dipropylene glycol, tripropylene glycol and tetrapropylene glycol; trimethylolpropane, glycerin, 1,3-propanediol, 1,3-butanediol, 1,4-butanediol, 1,5-pentanediol, 1,6-hexanediol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, 1,2-cyclohexanedimethanol, 1,3-cyclohexanedimethanol, 1,4-cyclohexanedimethanol, 2,2,4,4-tetramethyl-1,3-cyclobutanediol; and the like. The ester-forming derivatives of polyols include derivatives in which the hydroxyl group of the polyol is acetated, and the like. They can be used alone or in combination of two or more.

[Aqueous Polyurethane Resin]

The aqueous polyurethane resin may be any polyurethane resin which can be dissolved or dispersed in the aqueous solvent or the aqueous dispersion medium. Specific examples of the aqueous polyurethane resin include those obtained by subjecting a diisocyanate and a polyol to a polyaddition reaction, and further neutralizing and chain-elongating them to make them aqueous. They can be used alone or in combination of two or more.

[Aqueous Acrylic Resin]

The aqueous acrylic resin may be any acrylic resin which can be dissolved or dispersed in the aqueous solvent or the aqueous dispersion medium. Specific examples of the aqueous acrylic resin include the anionic aqueous acrylic resin which is a copolymer of (meth)acrylic acid esters and anionic polymerizable monomers, and cationic aqueous acrylic resin which is a copolymer of (meth)acrylic acid esters and cationic polymerizable monomers. They can be used alone or in combination of two or more.

[Aqueous Epoxy Resin]

The aqueous epoxy resin may be any epoxy resin which can be dissolved or dispersed in the aqueous solvent or the aqueous dispersion medium. Specific examples of the aqueous epoxy resin include the aqueous epoxy resin obtained by using as a raw material any of a) bisphenol type epoxy oligomers, b) a modified epoxy resin obtained by reacting the bisphenol type epoxy oligomers with any of fatty acid and its derivative, fatty acid amide, and unsaturated group-containing amine, and c) a modified epoxy resin obtained by reacting bisphenol A with a mixture of the bisphenol-type epoxy oligomers and polyalkylene glycol diglycidyl ether, by reacting an amine compound with an epoxy group in the above a) to c) raw material resins, and by neutralizing a part of the introduced amine groups with an acid to make them water-soluble or water-dispersible. They can be used alone or in combination of two or more.

[Metal Nanowire Dispersion Medium]

The metal nanowire-containing composition contains the metal nanowire dispersion medium. The metal nanowire dispersion medium may be any compound in which the metal nanowires can be dispersed, and which can dissolve other components in the metal nanowire-containing composition, and evaporate at the time of film formation to form a uniform coating film. Examples of the metal nanowire dispersion medium include water and alcohols. Specific examples of the alcohols include methanol, ethanol, 1-propanol, 2-propanol, 1-butanol, 2-butanol, 2-methylpropanol, 1,1-dimethylethanol, cyclohexanol and the like. They can be used alone or in combination of two or more.

[Other Additives Which Can be Added to Metal Nanowire-Containing Composition]

Various additives can be added to the metal nanowire-containing composition within a range where effects of the present invention are not prevented. As the additives, for example, surfactants, crosslinking agents, pH adjusters, conductivity aids, thickeners, organic fine particles, flame retardants, flame retardant aids, oxidation resistant stabilizers, leveling agents, slip activators, antistatic agents, dyes, fillers and the like can be used.

[Resin Composition for Coating Metal Nanowire-Containing Layer]

The resin composition for coating the metal nanowire-containing layer is the composition containing the photopolymerization initiator and/or the thermal polymerization initiator, and the polymerizable monomers and/or macromonomers, and the weather resistance improver, and further containing the solvent, a curing aid, and the other additives described below, as needed.

Incidentally, a predetermined molded product is obtained by curing the resin composition for coating the metal nanowire-containing layer.

[Photopolymerization Initiator]

The photopolymerization initiator is not particularly limited but may be the photopolymerization initiator obtained by a known method or of a commercially available product. Specific examples of the photopolymerization initiator include 1-hydroxycyclohexyl phenyl ketone, diethoxyacetophenone, 2-hydroxy-2-methyl-1-phenylpropan-1-one, 1-[4-(2-hydroxyethoxy)-phenyl]-2-hydroxy-2-methyl-1-propan-1-one, benzoin, benzoin methyl ether, benzoin ethyl ether, benzoylbenzoic acid, methyl benzoylbenzoate, 2-methyl-1-[4-(methylthio) phenyl]-2-(4-morpholinyl)-1-propanone, xanthone, anthraquinone, 2-methylanthraquinone and the like. They can be used alone or in combination of two or more.

[Thermal Polymerization Initiator]

The thermal polymerization initiator is not particularly limited but may be the thermal polymerization initiator obtained by a known method or of a commercially available product. Specific examples of the thermal polymerization initiator include: persulfates such as ammonium persulfate, sodium persulfate and potassium persulfate; peroxides such as t-butyl hydroperoxide, cumene hydroperoxide, benzoyl peroxide and lauroyl peroxide; redox initiator by combining persulfates or peroxides with reducing agents such as sulfite, bisulfite, thiosulfate, sodium formaldehyde sulfoxylate, ferrous sulfate, ferrous ammonium sulfate, glucose, ascorbic acid; and azo compounds such as 2,2'-azobisisobutyronitrile, 2,2'-azobis(2,4-dimethylvaleronitrile), 2,2'-azobis(2-methylbutyronitrile), 2, 2'-azobis(2-methylpropionic acid) dimethyl, and 2,2'-azobis(2-amidino propane) dihydrochloride. They can be used alone or in combination of two or more.

[Polymerizable Monomer and Macromonomer]

The polymerizable monomers and macromonomers can be used without particular limitation if they are monomers and macromonomers to be polymerized directly by irradiation of ionizing radiation such as visible light, ultraviolet light or electron beam, or under an action of the initiator. Specific examples of the polymerizable monomer having one functional group in one molecule include: (meth)acrylic acid esters such as (meth)acrylic acid, methyl (meth)acrylate, ethyl (meth)acrylate, butyl (meth)acrylate, 2-ethylhexyl (meth)acrylate, cyclohexyl (meth)acrylate, phenoxyethyl (meth)acrylate, 2-hydroxyethyl (meth)acrylate, methoxy-diethylene glycol (meth)acrylate, and methoxy-triethylene glycol (meth)acrylate; (meth)allyl compounds such as (meth)allyl alcohol and glycerol mono (meth)allyl ether; aromatic vinyls such as styrene, methylstyrene and butylstyrene; carboxylic acid vinyl esters such as vinyl acetate; and (meth)acrylamides such as (meth)acrylamide, N-cyclohexyl (meth)acrylamide, N-phenyl (meth)acrylamide, and N-(2-hydroxyethyl) (meth)acrylamide. Further, specific examples of the polymerizable monomer having two or more functional groups in one molecule include polyethylene glycol di(meth)acrylate, trimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, dipentaerythritol hexa(meth)acrylate, alkyl modified dipentaerythritol pentaerythritol, ethylene oxide modified bisphenol A di(meth)acrylate, ethylene oxide modified trimethylolpropane tri(meth)acrylate, propylene oxide modified trimethylolpropane tri(meth)acrylate, and ethylene oxide-modified isocyanuric acid triacrylate. As specific examples of the macromonomer, a polymerizable urethane acrylate resin, a polymerizable polyurethane resin, a polymerizable acrylic resin, a polymerizable epoxy resin, and a polymerizable polyester resin having an average of one or more polymerizable unsaturated group per molecule can be used. They can be used alone or in combination of two or more.

[Solvent]

The resin composition for coating the metal nanowire-containing layer can further contain the solvent. The solvent may be any compound which dissolves other components in the resin composition for coating the metal nanowire-containing layer and evaporates during film formation to form the uniform coating film. Specific examples of the solvent include water, methanol, ethanol, 1-propanol, 2-propanol, acetone, methyl ethyl ketone, toluene, n-hexane, n-butyl alcohol, diacetone alcohol, methyl isobutyl ketone, methyl butyl ketone, ethyl butyl ketone, cyclohexanone, ethyl acetate, butyl acetate, propylene glycol monomethyl ether acetate, ethylene glycol monoethyl ether, propylene glycol monomethyl ether, diethylene glycol diethyl ether, diethylene glycol ethyl methyl ether, 1,3-butylene glycol diacetate, cyclohexanol acetate, propylene glycol diacetate, tetrahydrofurfuryl alcohol, methyl ethyl diglycol, N methyl-2-pyrrolidone, and the like. They can be used alone or in combination of two or more.

[Curing Aid]

The resin composition for coating the metal nanowire-containing layer can further contain the curing aid. The curing aid may be any compound having two or more reactive functional groups in one molecule. Specific examples of the reactive functional group include an isocyanate group, an acryl group, a methacryl group, a mercapto group and the like. They can be used alone or in combination of two or more.

[Other Additives Which Can be Added to Resin Composition for Coating Metal Nanowire-Containing Layer]

Various additives can be added to the resin composition for coating the metal nanowire-containing layer within the range where the effects of the present invention are not prevented. As the additives, for example, the organic fine particles, the flame retardants, the flame retardant aids, the oxidation resistant stabilizers, the leveling agents, the slip activators, the antistatic agents, the dyes, the fillers and the like can be used.

[Film Formation]

A well-known coating method can be used as the coating method of the resin composition for coating the metal nanowire-containing layer, and the metal nanowire-containing composition. Specific examples of the coating method include a spin coating method, a slit coating method, a dip coating method, a blade coating method, a bar coating method, a spray method, a letterpress printing method, an intaglio printing method, a screen printing method, a lithographic printing method, a dispensing method, an inkjet method and the like. Further, coating may be repeated several times using these coating methods.

[Lamination Method]

A method for manufacturing the metal nanowire-containing laminate is not particularly limited. For example, the manufacturing method includes a method in which the metal nanowire-containing composition is film-formed on the substrate to form the metal nanowire-containing layer, and the resin composition for coating the metal nanowire-containing layer is film-formed on an upper surface of the metal nanowire-containing layer to form the protective layer of the metal nanowire-containing layer, a method in which the protective layer is formed on the substrate in advance, and the metal nanowire-containing layer and the protective layer are sequentially formed thereon, or the like.

The metal nanowire-containing composition can be diluted in any concentration and applied depending on the coating method. Water and alcohols are mentioned as a dilution dispersion medium. Specific examples of the alcohols include methanol, ethanol, 1-propanol, 2-propanol, 1-butanol, 2-butanol, 2-methylpropanol, 1,1-dimethylethanol, cyclohexanol and the like. They can be used alone or in combination of two or more.

The resin composition for coating the metal nanowire-containing layer can be diluted in any concentration and applied depending on the coating method. Specific examples of the dilution dispersion medium include water, methanol, ethanol, 1-propanol, 2-propanol, diacetone alcohol, acetone, methyl ethyl ketone, toluene, n-hexane, n-butyl alcohol, methyl isobutyl ketone, methyl butyl ketone, ethyl butyl ketone, cyclohexanone, ethyl acetate, butyl acetate, propylene glycol monomethyl ether acetate, ethylene glycol monoethyl ether, propylene glycol monomethyl ether, diethylene glycol diethyl ether, diethylene glycol ethyl methyl ether, 1,3-butylene glycol diacetate, cyclohexanol acetate, propylene glycol diacetate, tetrahydrofurfuryl alcohol, methyl ethyl diglycol, N-methyl-2-pyrrolidone and the like. They can be used alone or in combination of two or more.

The weather resistance improver of the present invention can suppress deterioration of the transparent conductive film using the metal nanowires under both conditions of long-term exposure to sunlight and high-temperature/high-humidity. Therefore, the weather resistance improver is widely applied to form the transparent conductive film of various devices, for example, such as an electrode material for liquid crystal display, an electrode material for plasma display, an electrode material for organic electroluminescent display, an electrode material for electronic paper, an electrode material for touch panel, an electrode material for thin film amorphous silicon solar cell, an electrode material for dye-sensitized solar cell, an electromagnetic wave shielding material, and an antistatic material.

EXAMPLES

Hereinafter, the present invention will be specifically described based on Examples of the present invention, however, the present invention is not limited to Examples. Further, in Examples, the silver nanowire was used as a representative example of the metal nanowire defined by the present invention. In Examples and Comparative Examples, "parts" and "%" are based on mass unless otherwise specified. In Examples and Comparative Examples, pure water was used as water as a component.

[Diameter of Silver Nanowire]

One hundred silver nanowires were observed using a scanning electron microscope (SEM; JSM-5610LV manufactured by JEOL Ltd.), and the diameter of the silver nanowires was determined from an arithmetic mean value thereof

[Long Axis Length of Silver Nanowire]

One hundred silver nanowires were observed using the scanning electron microscope (SEM; JSM-5610LV manufactured by JEOL Ltd.), and the long axis length of the silver nanowires was determined from the arithmetic mean value thereof.

[Average Surface Resistivity of Silver Nanowire-Containing Laminate]

Surface resistivities ($\Omega$/sq) of 10 different sites on the silver nanowire-containing laminate was measured, and an average surface resistivity of the silver nanowire-containing laminate was determined from the arithmetic mean value thereof. A non-contact surface resistance measuring instrument EC-80P (manufactured by Napson Corporation) was used for measuring surface resistivity.

[Variation in Total Light Transmittance of Substrate Having Silver Nanowire-Containing Laminate]

Total light transmittances of the substrate to which nothing applied and the substrate having the silver nanowire-containing laminate were measured, and a variation in total light transmittance of the substrate having the silver nanowire-containing laminate was determined from a difference between total light transmittances. The lower a value of the variation in total light transmittance, the higher the transparency of the silver nanowire-containing laminate. The total light transmittance was measured using NDH5000 (manufactured by Nippon Denshoku Industries Co., Ltd.).

[Variation in Haze of Substrate Having Silver Nanowire-Containing Laminate]

Hazes of the substrate to which nothing applied and the substrate having the silver nanowire-containing laminate were measured, and the variation in haze of the substrate having the silver nanowire-containing laminate was determined from the difference between hazes. The lower the value of the variation in haze, the lower turbidity of the silver nanowire-containing laminate. The haze was measured using NDH5000 (manufactured by Nippon Denshoku Industries Co., Ltd.).

[Photostability of Silver Nanowire-Containing Laminate]

A photoelastic resin (manufactured by 3M Co., Ltd., trade name 8146-2, film thickness 50 μm) was bonded on the silver nanowire-containing laminate formed on a PET film after peeling off a separator on one side thereof. Further, a glass substrate (manufactured by AS ONE Corporation, slide glass made of soda glass) was bonded on the other side of the bonded photoelastic resin after peeling off the separator on the other side thereof, to prepare the laminate in which the silver nanowire-containing laminate, the photoelastic resin and the glass were sequentially laminated on the PET film. A black tape (manufactured by Nichiban Co., Ltd., vinyl tape VT-50 black) was bonded on the glass surface side to cover half of an entire surface of the laminate, to prepare two samples for photostability test by a weather resistance tester and a fluorescent lamp. These tests are accelerated tests to confirm long-term stability.

The surface resistivity of the prepared photostability test sample was measured from a surface of the PET film. The surface resistivity was measured by using the non-contact surface resistance measuring instrument EC-80P (manufactured by Napson Corporation). The surface resistivity was measured at three points of an irradiated portion (an area where the black tape was not attached), a boundary portion (a boundary area between areas where the black tape is attached and not attached) and a light shielding portion (an area where the black tape is attached), and this surface resistivity was taken as each initial value (Rp0) of each portion.

Subsequently, a xenon lamp was irradiated on a first photostability test sample using the weather resistance tester (manufactured by Atlas Material Technology, SUNTEST CPS+). Test conditions were daylight filter loading, black panel temperature of 70° C., irradiation intensity of 750 W/m² (integrated value of spectral irradiance of wavelength 300 nm to 800 nm), temperature in test chamber of 42° C., humidity of 50% RH, and test time of 240 hours and 480 hours. The xenon lamp was irradiated from a black tape attached surface side of the photostability test sample. After the photostability test, the sample was left to stand at room temperature for one day, and then the surface resistivity of the irradiated portion, the boundary portion and the light shielding portion was measured again. This surface resistivity was taken as the surface resistivity (Rp1) after the photostability test by the weather resistance tester.

In parallel, a second photostability test sample was irradiated using a fluorescent lamp (Mellow 5N 30). The test conditions were irradiation degree of 20000 lx, environmental temperature of 25° C., humidity of 50% RH, and test time of 240 hours and 480 hours. The fluorescent lamp was irradiated from the black tape attached surface side of the photostability test sample. After the photostability test, the sample was left to stand at room temperature for one day, the surface resistivity of the irradiated portion, the boundary portion and the light shielding portion was measured again. This surface resistivity was taken as the surface resistivity (Rp2) after the photostability test by the weather resistance tester.

Photostability of the silver nanowire-containing laminate was evaluated based on the surface resistivities Rp0, Rp1 and Rp2 before and after the photostability test according to the following criteria.

AA; |1−(Rp1/Rp0)|, |1−(Rp2/Rp0)| are both 0.05 or less
A; |1−(Rp1/Rp0)|, |1−(Rp2/Rp0)| are both greater than 0.05 and 0.1 or less
BB; |1−(Rp1/Rp0)|, |1−(Rp2/Rp0)| are both greater than 0.1 and 0.2 or less
B; |1−(Rp1/Rp0)|, |1−(Rp2/Rp0)| are both greater than 0.2 and 0.3 or less
C; |1−(Rp1/Rp0)|, |1−(Rp2/Rp0)| are both greater than 0.3 and 0.5 or less
CC; |1−(Rp1/Rp0)|, |1−(Rp2/Rp0)| are both greater than 0.5

It was determined that the sample having an absolute value of change rate exceeding 0.3 represented by C or CC was not practical as the transparent conductive film.

[High-Temperature/High-Humidity Stability of Silver Nanowire-Containing Laminate]

The silver nanowire-containing laminate was left to stand in an environment of 85° C. and 85% RH for 240 hours to perform high-temperature/high-humidity stability test using a thermo-hygrostat tester (manufactured by Isuzu Seisakusho Co., Ltd., TPAV-48-20). The surface resistivity before the high-temperature/high-humidity stability test was measured, and this surface resistivity was taken as the initial value (Rw0). The non-contact surface resistance measuring instrument EC-80P (manufactured by Napson Corporation) was used for measuring the surface resistivity. After the high temperature/high humidity stability test, the surface resistivity was measured again after standing at room temperature for one day. This surface resistivity was taken as the surface resistivity (Rw1) after the high temperature/high humidity stability test.

High-temperature/high-humidity stability of the silver nanowire-containing laminate was evaluated based on the surface resistivities Rw0 and Rw1 before and after the high-temperature/high-humidity stability test according to the following criteria.

AA; |1−(Rw1/Rw0)|≤0.05
A; 0.05<|1−(Rw1/Rw0)|≤0.1
BB; 0.1 <|1−(Rw1/Rw0)|≤0.2
B; 0.2<|1−(Rw1/Rw0)|≤0.3
C; 0.3<|1−(Rw1/Rw0)|≤0.5
CC; 0.5<|1−(Rw1/Rw0)|

It was determined that the sample having the absolute value of change rate of exceeding 0.3 represented by C or CC was not practical as the transparent conductive film.

[Preparation of Silver Nanowire Dispersion Liquid]

Under light shielding, while feeding nitrogen into a four-necked flask with a stirrer, thermometer, and nitrogen inlet tube (hereinafter "four-necked flask with a stirrer, thermometer, and nitrogen inlet tube" is referred to as "four-necked flask"), 1.00 parts by mass of N-(2-hydroxyethyl) acrylamide polymer having a weight average molecular weight of 290,000 as a silver nanowire growth control agent, and 117.9 parts by mass of 1,2-propanediol were added and dissolved by stirring at 120° C. Here, 9.0 parts by mass of 1,2-propanediol and 0.0054 parts by mass of ammonium chloride were added, temperature was raised to 140° C., and the mixture was stirred for 15 minutes. Further, 40.0 parts by mass of 1,2-propanediol and 0.85 parts by mass of silver nitrate were added, and the mixture was stirred at 140° C. for 45 minutes to prepare the silver nanowire. A large excess of pure water was added to the obtained silver nanowire dispersion liquid, a silver nanowire component was separated by filtration, and the residue was redispersed in water which is a silver nanowire dispersion medium. The silver nanowire component was purified by repeating this operation multiple times to prepare the silver nanowire dispersion liquid having a silver nanowire content of 12.5 mass %. The obtained silver nanowire had an average long axis length of 14 μm and an average diameter of 41 nm.

[Preparation of Binder (a)]

After 20 parts by mass of hydroxypropyl methylcellulose (manufactured by Shin-Etsu Chemical Co., Ltd., product name: METOLOSE 90SH15000) and 950 parts by mass of pure water were charged into the four-necked flask, 0.3 parts by mass of 10 mass % citric acid was added, and the temperature was raised to 50° C. Subsequently, 0.1 parts by mass of N-methylol acrylamide was added and stirred for 6 hours. Further, the temperature was raised to 70° C., and 15 parts by mass of methyl methacrylate, 5 parts by mass of n-butyl acrylate, and 8 parts by mass of 1 mass % ammonium persulfate aqueous solution were added while passing nitrogen gas, and the mixture was stirred for 3 hours to synthesize 4.0 mass % binder (a) which is a hydroxypropyl methylcellulose dispersion liquid obtained by graft-polymerizing (meth)acrylic acid esters.

[Preparation of Binder (b)]

After 106 parts by mass of dimethyl terephthalate, 78 parts by mass of dimethyl isophthalate, 18 parts by mass of dimethyl sodium 5-sulfoisophthalate, 124 parts by mass of ethylene glycol, and 0.8 parts by mass of anhydrous sodium acetate were charged into the four-necked flask while passing nitrogen gas, the temperature was raised to 150° C. while stirring. While the generated methanol was distilled out of the reaction system, the temperature was further raised to 180° C. and the mixture was stirred for 3 hours. 0.2 parts by mass of tetra-n-butyltitanate was added, the temperature is raised to 230° C. while stirring, and after stirring for 7 hours while distilling the generated ethylene glycol out of the reaction system under a reduced pressure of 10 hPa, the temperature was cooled to 180° C. After 1 part by mass of trimellitic anhydride was added and stirred for 3 hours, the mixture was cooled to room temperature to synthesize the aqueous polyester resin (B-1). After 200 parts by mass of the above aqueous polyester resin (B-1) and 298 parts by mass of pure water were charged into the four-necked flask, the temperature was raised to 60° C. while stirring to dissolve the aqueous polyester resin. 2.5 parts by mass of glycidyl methacrylate was added and stirred for 1 hour. Further, 279 parts by mass of pure water was added and cooled to 40° C. while stirring, 37.5 parts by mass of methyl methacrylate and 12.5 parts by mass of n-butyl acrylate were added, and the temperature was raised to 70° C. while stirring. After 4 parts by mass of 1 mass % ammonium persulfate was added while passing nitrogen gas, and stirred for 4 hours, 167 parts by mass of pure water was added to synthesize a binder (b) which is an aqueous polyester resin dispersion liquid obtained by graft-polymerizing 10.0 mass % (meth)acrylic acid ester.

[Preparation of Silver Nanowire-Containing Composition (1)]

After 0.48 parts by mass of 12.5 mass % silver nanowire dispersion liquid, 2.00 parts by mass of binder (a) as the binder, and 97.52 parts by mass of pure water as the dispersion medium were charged into the four-necked flask, the mixture was stirred until it became a uniform dispersion liquid, to prepare a silver nanowire containing composition (1).

[Preparation of Silver Nanowire-Containing Composition (2)]

After 0.48 parts by mass of 12.5 mass % silver nanowire dispersion liquid, 2.00 parts by mass of binder (a) as the binder, 0.006 parts by mass of 3-(1,3-benzothiazole-2-yl-thio) propionic acid as the weather resistance improver, and 97.514 parts by mass of pure water as the dispersion medium were charged into the four-necked flask, the mixture was stirred until it became the uniform dispersion liquid, to prepare a silver nanowire containing composition (2).

[Preparation of Silver Nanowire-Containing Composition (3)]

After 0.48 parts by mass of 12.5 mass % silver nanowire dispersion liquid, 1.50 parts by mass of the binder (a) as the binder, 0.20 parts by mass of the binder (b), and 97.82 parts by mass of pure water as the dispersion medium were charged into the four-necked flask, the mixture was stirred until it became the uniform dispersion liquid, to prepare a silver nanowire-containing composition (3).

[Preparation of Resin Composition for Coating Silver Nanowire-Containing Layer]

After 15 parts by mass of dipentaerythritol hexaacrylate as the polymerizable monomers and macromonomers, 5 parts by mass of trimethylolpropane triacrylate, 0.8 parts by mass of 1-hydroxycyclohexyl phenyl ketone as the polymerization initiator, 0.03 parts by mass of 2-mercaptobenzothiazole (0.15 mass % with respect to the polymerizable monomer/macromonomer) as the weather resistance improver, 3 parts by mass of 50% phytic acid (1.5 parts by mass as pure phytic acid, 0.7 mmol/g as the amount of phosphorus atom with respect to the polymerizable monomer/macromonomer), and 80 parts by mass of propylene glycol monomethyl ether as the solvent were charged into the four-necked flask, the mixture was stirred until it became a homogeneous solution, to prepare a resin composition (1) for coating a silver nanowire-containing layer.

Resin compositions (2) to (33) for coating the silver nanowire-containing layer were obtained in the same manner as the resin composition (1) for coating the silver nanowire-containing layer except that the weather resistance improver of preparation example of the resin composition (1) for coating the silver nanowire-containing layer was replaced as shown in Tables 1 and 2 below.

After 15 parts by mass of dipentaerythritol hexaacrylate as the polymerizable monomers and macromonomers, 5 parts by mass of trimethylolpropane triacrylate, 0.8 parts by mass of 1-hydroxycyclohexyl phenyl ketone as the polymerization initiator, 0.3 parts by mass of 2-mercaptobenzothiazole (1.5 mass % with respect to the polymerizable monomer/macromonomer) as the weather resistance improver, 0.4 parts by mass of 50% phosphinic acid (0.2 parts by mass as pure phosphinic acid, 0.15 mmol/g as the amount of phosphorus atom with respect to the polymerizable monomer/macromonomer), 0.3 parts by mass of di-n-butylamine as the neutralizing agent (0.12 mmol/g with respect to the polymerizable monomer/macromonomer, 0.8 equivalents to the atomic group represented by P—OH of phosphinic acid), and 80 parts by mass of propylene glycol monomethyl ether as the solvent were charged into the four-necked flask, the mixture was stirred until it became the homogeneous solution, to prepare a resin composition (34) for coating the silver nanowire-containing layer.

Resin compositions (35) and (36) for coating the silver nanowire-containing layer were obtained in the same manner as the resin composition (34) for coating the silver nanowire-containing layer except that the neutralizing agent of the preparation example of the resin composition (34) for coating the silver nanowire-containing layer was replaced as shown in Table 2 below.

TABLE 1

| Resin composition for coating silver nanowire layer | | (1) | (2) | (3) | (4) | (5) | (6) | (7) | (8) | (9) | (10) | (11) | (12) | (13) | (14) | (15) | (16) | (17) | (18) |
|---|---|---|---|---|---|---|---|---|---|---|---|---|---|---|---|---|---|---|---|
| Polymerizable monomer/macromonomer (parts by mass) | Dipentaerythritol-hexaacrylate | 15 | 15 | 15 | 15 | 15 | 15 | 15 | 15 | 15 | 15 | 15 | 15 | 15 | 15 | 15 | 15 | 15 | 15 |
| | Trimethylolpropane-triacrylate | 5 | 5 | 5 | 5 | 5 | 5 | 5 | 5 | 5 | 5 | 5 | 5 | 5 | 5 | 5 | 5 | 5 | 5 |
| Polymerization initiator (parts by mass) | 1-hydroxycyclohexyl phenyl ketone | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Weather resistance improver | Compound (A) (mass % with respect to polymerizable monomer/macromonomer) | 0.15 | | | | | | 1.5 | 1.5 | 1.5 | 1.5 | 1.5 | 1.5 | 1.5 | 1.5 | 1.5 | 1.5 | 1.5 | 1.5 |
| | 2-mercaptothiazoline | — | 5 | 0.3 | 4 | 0.5 | 3 | — | — | — | — | — | — | — | — | — | — | — | — |
| | 2-mercaptobenzothiazole | — | — | — | — | — | — | — | — | — | — | — | — | — | — | — | — | — | — |
| | 3-(1,3-benzothiazol-2-ylthio) propionic acid | — | — | — | — | — | — | — | — | — | — | — | — | — | — | — | — | — | — |
| | (1,3-benzothiazol-2-ylthio) succinic acid | — | — | — | — | — | — | — | — | — | — | — | — | — | — | — | — | — | — |
| | Compound (B) (as amount of phosphorus atom: mmol/g with respect to polymerizable monomer/macromonomer) | 0.7 | 0.2 | 0.6 | 0.03 | 0.5 | 0.06 | 0.15 | 0.15 | 0.15 | 0.15 | 0.15 | — | — | — | — | — | — | — |
| | Phytic acid (50% aqueous solution) | — | — | — | — | — | — | 0.15 | — | — | — | — | — | — | — | — | — | — | — |
| | Phosphoric acid (85% aqueous solution) | — | — | — | — | — | — | — | 0.15 | — | — | — | — | — | — | — | — | — | — |
| | Dibutyl phosphate | — | — | — | — | — | — | — | — | 0.15 | — | — | — | — | — | — | — | — | — |
| | 2-(acryloyloxy) ethyl phosphate (trade name: LIGHT ACRYLATE P-1A, manufactured by Kyoeisha Chemical Co., Ltd.) | — | — | — | — | — | — | — | — | — | 0.15 | — | — | — | — | — | — | — | — |
| | Bis[2-(methacryloyloxy) ethyl] phosphate (trade name: LIGHT ESTER P-2M, manufactured by Kyoeisha Chemical Co., Ltd.) | — | — | — | — | — | — | — | — | — | — | 0.15 | — | — | — | — | — | — | — |

TABLE 1-continued

| Resin composition for coating silver nanowire layer | | (1) | (2) | (3) | (4) | (5) | (6) | (7) | (8) | (9) | (10) | (11) | (12) | (13) | (14) | (15) | (16) | (17) | (18) |
|---|---|---|---|---|---|---|---|---|---|---|---|---|---|---|---|---|---|---|---|
| | Acid phosphoxy polyethylene glycol mono(meth)acrylate (trade name: Phosmer PE, manufactured by Uni Chemical Co., Ltd.) | — | — | — | — | — | — | — | — | — | — | — | 0.15 | — | — | — | — | — | — |
| | Acid phosphoxy polypropylene glycol mono(meth)acrylate (trade name: Phosmer PP, manufactured by Uni Chemical Co., Ltd.) | — | — | — | — | — | — | — | — | — | — | — | — | 0.15 | — | — | — | — | — |
| | Phosphonic acid | — | — | — | — | — | — | — | — | — | — | — | — | — | 0.15 | — | — | — | — |
| | Octylphosphonic acid | — | — | — | — | — | — | — | — | — | — | — | — | — | — | 0.15 | — | — | — |
| | Phenylphosphonic acid | — | — | — | — | — | — | — | — | — | — | — | — | — | — | — | 0.15 | — | — |
| | Vinylphosphonic acid | — | — | — | — | — | — | — | — | — | — | — | — | — | — | — | — | 0.15 | — |
| | 6-phosphonohexanoic acid | — | — | — | — | — | — | — | — | — | — | — | — | — | — | — | — | — | 0.15 |
| Neutralizing agent (mmol/g) | Di-n-butylamine | — | — | — | — | — | — | — | — | — | — | — | — | — | — | — | — | — | — |
| Solvent (parts by mass) | Propylene glycol monomethyl ether | 80 | 80 | 80 | 80 | 80 | 80 | 80 | 80 | 80 | 80 | 80 | 80 | 80 | 80 | 80 | 80 | 80 | 80 |

TABLE 2

| Resin composition for coating silver nanowire layer | | (19) | (20) | (21) | (22) | (23) | (24) | (25) | (26) | (27) | (28) | (29) | (30) | (31) | (32) | (33) | (34) | (35) | (36) |
|---|---|---|---|---|---|---|---|---|---|---|---|---|---|---|---|---|---|---|---|
| Polymerizable monomer/macromonomer (parts by mass) | Dipentaerythritol-hexaacrylate | 15 | 15 | 15 | 15 | 15 | 15 | 15 | 15 | 15 | 15 | 15 | 15 | 15 | 15 | 15 | 15 | 15 | 15 |
| | Trimethylolpropanetriacrylate | 5 | 5 | 5 | 5 | 5 | 5 | 5 | 5 | 5 | 5 | 5 | 5 | 5 | 5 | 5 | 5 | 5 | 5 |
| Polymerization initiator (parts by mass) | 1-hydroxycyclohexyl phenyl ketone | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Weather resistance improver | Compound (A) (mass % with respect to polymerizable monomer/macromonomer) | | | | | | | | | | | | | | | | | | |
| | 2-mercaptothiazoline | 1.5 | 1.5 | 1.5 | 1.5 | 1.5 | 1.5 | 1.5 | 1.5 | 1.5 | 1.5 | 1.5 | 1.5 | — | — | — | — | — | — |
| | 2-mercaptobenzothiazole | — | — | — | — | — | — | — | — | — | — | — | — | 1.5 | 1.5 | — | 1.5 | 1.5 | 1.5 |
| | 3-(1,3-benzothiazol-2-ylthio) propionic acid | — | — | — | — | — | — | — | — | — | — | — | — | — | — | 1.5 | — | — | — |
| | (1,3-benzothiazol-2-ylthio) succinic acid | — | — | — | — | — | — | — | — | — | — | — | — | — | — | — | — | — | — |
| | Compound (B) (as amount of phosphorus atom: mmol/g with respect to polymerizable monomer/macromonomer) | | | | | | | | | | | | | | | | | | |
| | (12-phosphonododecyl) phosphonic acid | 0.15 | — | — | — | — | — | — | — | — | — | — | — | — | — | — | — | — | — |
| | Etidronic acid (60% aqueous solution) | — | 0.15 | — | — | — | — | — | — | — | — | — | — | — | — | — | — | — | — |
| | Phosphinic acid (50% aqueous solution) | — | — | 0.15 | — | — | — | — | — | — | — | — | — | 0.15 | 0.15 | 0.15 | 0.15 | 0.15 | 0.15 |
| | Dimethylphosphinic acid | — | — | — | 0.15 | — | — | — | — | — | — | — | — | — | — | — | — | — | — |
| | Diisooctylphosphinic acid | — | — | — | — | 0.15 | — | — | — | — | — | — | — | — | — | — | — | — | — |
| | Phenylphosphinic acid | — | — | — | — | — | 0.15 | — | — | — | — | — | — | — | — | — | — | — | — |
| | Diphenylphosphinic acid | — | — | — | — | — | — | 0.15 | — | — | — | — | — | — | — | — | — | — | — |
| | (2-carboxyethyl) phenyl-phosphinic acid | — | — | — | — | — | — | — | 0.15 | — | — | — | — | — | — | — | — | — | — |
| | Bis(4-methoxyphenyl) phosphinic acid | — | — | — | — | — | — | — | — | 0.15 | — | — | — | — | — | — | — | — | — |
| | Bis(hydroxymethyl) phosphinic acid | — | — | — | — | — | — | — | — | — | 0.15 | — | — | — | — | — | — | — | — |
| | Methyl phenyl phosphinic acid | — | — | — | — | — | — | — | — | — | — | 0.15 | — | — | — | — | — | — | — |
| | Phenyl vinyl phosphinic acid | — | — | — | — | — | — | — | — | — | — | — | 0.15 | — | — | — | — | — | — |
| Neutralizing agent (mmol/g) | Di-n-butylamine | — | — | — | — | — | — | — | — | — | — | — | — | — | — | — | 0.12 | 0.75 | 0.03 |
| Solvent (parts by mass) | Propylene glycol monomethyl ether | 80 | 80 | 80 | 80 | 80 | 80 | 80 | 80 | 80 | 80 | 80 | 80 | 80 | 80 | 80 | 80 | 80 | 80 |

[Preparation of Silver Nanowire-Containing Layer (1)]

The silver nanowire-containing composition (1) was uniformly coated at 24 g/m$^2$ on a polyethylene terephthalate film (PET film, manufactured by Toray Industries, Inc., trade name "Lumirror U403") having a film thickness of 100 μm, and dried for one minute by a hot air convection dryer at 120° C., to prepare a silver nanowire-containing layer (1).

[Preparation of Silver Nanowire-Containing Layer (2)]

The silver nanowire-containing composition (2) was uniformly coated at 24 g/m$^2$ on the polyethylene terephthalate film (PET film, manufactured by Toray Industries, Inc., trade name "Lumirror U403") having a film thickness of 100 μm, and dried at 120° C. for one minute by the hot air convection dryer, to prepare a silver nanowire-containing layer (2).

[Preparation of Silver Nanowire-Containing Layer (3)]

The silver nanowire-containing composition (3) was uniformly coated at 24 g/m$^2$ on the polyethylene terephthalate film (PET film, manufactured by Toray Industries, Inc., trade name "Lumirror U403") having a film thickness of 100 μm, and dried at 120° C. for one minute by the hot air convection dryer, to prepare a silver nanowire-containing layer (3).

[Preparation of Silver Nanowire-Containing Layer (4)]

The resin composition (12) for coating the silver nanowire-containing layer was diluted 40 times with propylene glycol monomethyl ether, uniformly coated at 24 g/m$^2$ on the polyethylene terephthalate film (PET film, manufactured by Toray Industries, Inc., trade name "Lumirror U403") having the film thickness of 100 μm, and dried at 120° C. for 5 minutes by the hot air convection dryer, and then UV light was irradiated on a PET substrate from above under a condition of 500 mJ/cm$^2$ using a UV irradiation device UV1501C-SZ (manufactured by Cell Engineer Co., Ltd.), to form the protective layer of a silver nanowire layer. The silver nanowire-containing composition (1) was uniformly coated at 24 g/m$^2$ on the protective layer, and dried at 120° C. for one minute by the hot air convection dryer, to prepare a silver nanowire-containing layer (4).

EXAMPLE 1

<Preparation of Silver Nanowire-Containing Laminate (1)>

The resin composition (1) for coating the silver nanowire-containing layer was diluted 40 times with propylene glycol monomethyl ether, uniformly coated at 24 g/m$^2$ on the silver nanowire-containing layer (1), and dried at 120° C. for 5 minutes by the hot air convection dryer, and then UV light was irradiated on the PET substrate from above under the condition of 500 mJ/cm$^2$ using the UV irradiation device UV1501C-SZ (manufactured by SEN ENGINEERING Co., Ltd.), to form a silver nanowire-containing laminate (1). Table 3 shows components of the silver nanowire-containing laminate of Example 1 and an evaluation result.

EXAMPLES 2 to 39

Silver nanowire-containing laminates (2) to (39) were prepared in the same manner as the silver nanowire-containing laminate (1) except that the resin composition for coating the silver nanowire-containing layer and the metal nanowire-containing layer were replaced with those shown in Tables 3 and 4 below. Tables 3 and 4 show the components of the silver nanowire-containing laminates of Examples 2 to 39 and evaluation results. Note that when the hydroxyl group-containing phosphorus compound was an aqueous solution, it was added in pure form, and the mass of the contained water was ignored.

TABLE 3

| Item | | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|---|---|---|---|---|---|---|---|
| Silver nanowire-containing laminate | | (1) | (2) | (3) | (4) | (5) | (6) | (7) | (8) | (9) | (10) | (11) | (12) | (13) | (14) | (15) | (16) | (17) | (18) | (19) | (20) |
| Resin composition for coating silver nanowire layer | | (1) | (2) | (3) | (4) | (5) | (6) | (7) | (8) | (9) | (10) | (11) | (12) | (13) | (14) | (15) | (16) | (17) | (18) | (19) | (20) |
| Structure of silver nanowire-containing laminate | PET/Silver nanowire-containing layer/Protective layer | Applicable | Applicable | Applicable | Applicable | Applicable | Applicable | Applicable | Applicable | Applicable | Applicable | Applicable | Applicable | Applicable | Applicable | Applicable | Applicable | Applicable | Applicable | Applicable | Applicable |
| | PET/Protective layer/Silver nanowire-containing layer/Protective layer | — | — | — | — | — | — | — | — | — | — | — | — | — | — | — | — | Applicable | Applicable | Applicable | — |
| Evaluation result | Weather resistance tester photostability | After 240 hours | Irradiated portion | BB | BB | A | A | AA | AA | AA | AA | AA | AA | AA | AA | AA | AA | AA | AA | AA | AA | AA |
| | | | Boundary portion | B | B | BB | BB | A | A | A | A | A | A | A | A | A | A | A | A | A | A | A |
| | | | Shielded portion | B | B | BB | BB | BB | BB | A | A | A | A | A | A | A | A | A | A | A | A | A |
| | | After 480 hours | Irradiated portion | A | A | A | A | AA | AA | AA | AA | AA | AA | AA | AA | AA | AA | AA | AA | AA | AA | AA |
| | | | Boundary portion | BB | BB | BB | BB | A | A | A | A | A | A | A | A | A | A | A | A | A | A | A |
| | | | Shielded portion | B | B | B | B | BB | BB | A | A | A | A | A | A | A | A | A | A | A | A | A |

TABLE 3-continued

| Item | | | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 | Example 17 | Example 18 | Example 19 | Example 20 |
|---|---|---|---|---|---|---|---|---|---|---|---|---|---|---|---|---|---|---|---|---|---|---|
| Fluorescent light photostability | After 240 hours | Irradiated portion | BB | BB | BB | BB | BB | BB | AA | AA | AA | AA | AA | AA | AA | AA | AA | AA | AA | AA | AA | AA |
| | | Boundary portion | B | B | BB | BB | A | A | A | A | A | A | A | A | A | A | A | A | A | A | A | A |
| | | Shielded portion | A | A | A | A | A | A | A | A | A | A | A | A | A | A | A | A | A | A | A | A |
| | After 480 hours | Irradiated portion | BB | B | BB | BB | BB | BB | A | A | A | A | AA | A | A | AA | AA | AA | AA | AA | AA | AA |
| | | Boundary portion | B | B | BB | BB | A | A | A | A | A | A | A | A | A | A | A | A | A | A | A | A |
| | | Shielded portion | A | A | A | A | A | A | A | A | A | A | A | A | A | A | A | A | A | A | A | A |
| High-temperature/ high-humidity stability, After 240 hours | | | B | B | BB | BB | BB | BB | A | A | A | A | A | A | A | A | A | A | A | A | A | A |

TABLE 4

| Item | | Example 21 | Example 22 | Example 23 | Example 24 | Example 25 | Example 26 | Example 27 | Example 28 | Example 29 | Example 30 | Example 31 | Example 32 | Example 33 | Example 34 | Example 35 | Example 36 | Example 37 | Example 38 | Example 39 |
|---|---|---|---|---|---|---|---|---|---|---|---|---|---|---|---|---|---|---|---|---|
| Silver nanowire-containing laminate | | (21) | (22) | (23) | (24) | (25) | (26) | (27) | (28) | (29) | (30) | (31) | (32) | (33) | (34) | (35) | (36) | (37) | (38) | (39) |
| Resin composition for coating silver nanowire layer | | (21) | (22) | (23) | (24) | (25) | (26) | (27) | (28) | (29) | (30) | (31) | (32) | (33) | (34) | (35) | (36) | (21) | (21) | (21) |
| Structure of silver nanowire-containing laminate | PET/Silver nanowire-containing layer/Protective layer | (1) Applicable | (1) Applicable | (1) Applicable | (1) Applicable | (1) Applicable | (1) Applicable | (1) Applicable | (1) Applicable | (1) Applicable | (1) Applicable | (1) Applicable | (1) Applicable | (1) Applicable | (1) Applicable | (1) Applicable | (1) Applicable | (2) Applicable | (3) Applicable | (4) — |
| | PET/Protective layer/Silver nanowire-containing layer/Protective layer | — | — | — | — | — | — | — | — | — | — | — | — | — | — | — | — | — | — | Applicable |
| Evaluation result | Weather resistance tester photostability | After 240 hours Irradiated portion | AA | AA | AA | AA | AA | AA | AA | AA | AA | AA | AA | AA | AA | BB | A | A | AA | AA | AA |
| | | Boundary portion | AA | A | A | A | A | A | A | A | A | AA | A | AA | AA | B | BB | A | A | A | A |
| | | Shielded portion | A | A | AA | A | A | A | A | A | A | AA | A | A | A | B | BB | A | A | A | A |
| | | After 480 hours Irradiated portion | AA | AA | AA | AA | AA | AA | AA | AA | AA | AA | AA | AA | AA | BB | A | A | AA | AA | AA |

TABLE 4-continued

| Item | | | Example 21 | Example 22 | Example 23 | Example 24 | Example 25 | Example 26 | Example 27 | Example 28 | Example 29 | Example 30 | Example 31 | Example 32 | Example 33 | Example 34 | Example 35 | Example 36 | Example 37 | Example 38 | Example 39 |
|---|---|---|---|---|---|---|---|---|---|---|---|---|---|---|---|---|---|---|---|---|---|
| Fluorescent light photostability | After 240 hours | Boundary portion | AA | AA | AA | AA | AA | AA | AA | AA | AA | AA | A | A | A | B | BB | A | A | A | A |
| | | Shielded portion | A | A | A | A | AA | AA | A | A | A | AA | A | A | A | B | BB | A | A | A | A |
| | | Irradiated portion | AA | AA | AA | AA | AA | AA | AA | AA | AA | AA | AA | AA | AA | B | BB | A | AA | AA | AA |
| | After 480 hours | Boundary portion | A | AA | AA | AA | AA | AA | AA | AA | AA | AA | AA | AA | AA | B | BB | A | A | A | A |
| | | Shielded portion | AA | AA | AA | AA | AA | AA | AA | AA | AA | AA | A | A | A | BB | BB | A | A | A | A |
| | | Irradiated portion | AA | AA | AA | AA | AA | AA | AA | AA | AA | AA | AA | AA | AA | BB | A | A | AA | AA | AA |
| | | Boundary portion | AA | AA | AA | AA | AA | AA | AA | AA | AA | AA | AA | AA | AA | B | BB | A | A | A | A |
| | | Shielded portion | AA | AA | AA | AA | AA | AA | AA | AA | AA | AA | AA | AA | AA | BB | BB | A | A | A | A |
| High-temperature/ high-humidity stability, After 240 hours | | | AA | AA | AA | AA | AA | AA | AA | AA | AA | AA | AA | AA | AA | B | A | A | AA | AA | AA |

COMPARATIVE EXAMPLES 1 to 11

Silver nanowire-containing laminates (40) to (50) were obtained in the same manner as the silver nanowire-containing laminate (1) except that the resin composition for coating the silver nanowire-containing layer of the preparation example of the silver nanowire-containing laminate (1) was replaced as shown in Table 5 below. Tables 5 and 6 show the components of the silver nanowire-containing laminates of Comparative Examples 1 to 11 and the evaluation results. Note that an addition rate of carboxylic acid was calculated by the number of moles of carboxy group with respect to 1 g of the polymerizable monomers and/or macromonomers. The addition rate of tannic acid was calculated by the number of moles of phenolic hydroxy group with respect to 1 g of the polymerizable monomers and/or macromonomers.

TABLE 5

| Resin composition for coating silver nanowire layer | | (37) | (38) | (39) | (40) | (41) | (42) | (43) | (44) | (45) | (46) | (47) |
|---|---|---|---|---|---|---|---|---|---|---|---|---|
| Polymerizable monomer/macromonomer (parts by mass) | Dipentaerythritol-hexaacrylate | 15 | 15 | 15 | 15 | 15 | 15 | 15 | 15 | 15 | 15 | 15 |
| | Trimethylolpro-panetriacrylate | 5 | 5 | 5 | 5 | 5 | 5 | 5 | 5 | 5 | 5 | 5 |
| Polymerization initiator (parts by mass) | 1-hydroxycyclohexyl phenyl ketone | 0.8 | 0.8 | 0.8 | 0.8 | 0.8 | 0.8 | 0.8 | 0.8 | 0.8 | 0.8 | 0.8 |
| Weather resistance improver — Compound (A) (mass % with respect to polymerizable monomer/macromonomer) | 2-mercaptobenzothiazole | — | — | — | — | — | — | — | 1.5 | — | 1.5 | 1.5 |
| | 3-(1,3-benzothiazol-2-ylthio) propionic acid | — | — | — | — | — | — | — | — | 1.5 | — | — |
| Compound (B) (as amount of phosphorus atom: mmol/g with respect to polymerizable monomer/macromonomer) | Phosphinic acid | — | 0.15 | — | — | — | — | — | — | — | — | — |
| | Phosphonic acid | — | — | 0.15 | — | — | — | — | — | — | — | — |
| | Phosphoric acid | — | — | — | 0.15 | — | — | — | — | — | — | — |
| | Phytic acid | — | — | — | — | 0.15 | — | — | — | — | — | — |
| | Bis[2-(methacryloyl-oxy)ethyl] phosphate | — | — | — | — | — | 0.15 | — | — | — | — | — |
| Acidic compounds other than compound (B) (as amount of carboxy group: mmol/g with respect to polymerizable monomer/macromonomer, tannic acid as amount of phenolic hydroxy group: mmol/g with respect to polymerizable monomer/macromonomer) | Maleic acid | — | — | — | — | — | — | — | — | — | 0.15 | — |
| | Citric acid | — | — | — | — | — | — | — | — | — | — | 0.15 | — |
| | Tannic acid | — | — | — | — | — | — | — | — | — | — | — | 0.15 |
| Solvent (parts by mass) | Propylene glycol monomethyl ether | 80 | 80 | 80 | 80 | 80 | 80 | 80 | 80 | 80 | 80 | 80 |

TABLE 6

| Item | | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|---|
| Silver nanowire-containing laminate | | | | (40) | (41) | (42) | (43) | (44) | (45) | (46) | (47) | (48) | (49) | (50) |
| Resin composition for coating silver nanowire layer | | | | (37) | (38) | (39) | (40) | (41) | (42) | (43) | (44) | (45) | (46) | (47) |
| Silver nanowire-containing layer | | | | (1) | (1) | (1) | (1) | (1) | (1) | (1) | (1) | (1) | (1) | (1) |
| Structure of silver nanowire-containing laminate | PET/Silver nanowire-containing layer/Protective layer | | | Applicable | Applicable | Applicable | Applicable | Applicable | Applicable | Applicable | Applicable | Applicable | Applicable | Applicable |
| | PET/Protective layer/Silver nanowire-containing layer/Protective layer | | | — | — | — | — | — | — | — | — | — | — | — |
| Evaluation result | Weather resistance tester photostability | After 240 hours | Irradiated portion | C | A | A | A | A | A | A | A | A | A | AA |
| | | | Boundary portion | B | B | B | B | B | B | BB | BB | B | B | AA |
| | | | Shielded portion | B | B | B | B | B | B | BB | BB | B | B | AA |
| | | After 480 hours | Irradiated portion | C | B | B | B | B | B | C | C | A | A | AA |
| | | | Boundary portion | CC | B | B | B | B | B | CC | CC | BB | B | AA |
| | | | Shielded portion | C | B | B | B | B | B | B | B | C | B | AA |

TABLE 6-continued

| Item | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|
| Fluorescent light photostability | After 240 hours | Irradiated portion | CC | B | B | B | B | B | CC | CC | CC | CC | CC |
| | | Boundary portion | B | A | A | A | A | A | B | B | B | B | C |
| | | Shielded portion | A | CC | CC | CC | CC | CC | A | A | A | BB | AA |
| | After 480 hours | Irradiated portion | C | CC | CC | CC | CC | CC | B | B | C | B | A |
| | | Boundary portion | B | C | CC | CC | CC | C | B | B | A | A | A |
| | | Shielded portion | A | CC | CC | CC | CC | CC | A | A | A | A | AA |
| High-temperature/high-humidity stability, After 240 hours | | | CC | CC | CC | CC | CC | CC | A | A | C | A | AA |

Average surface resistivities of the obtained silver nanowire-containing laminates were all 60 Ω/sq or less, and good average surface resistivity could be secured.

Variations in total light transmittance of the substrates by the obtained silver nanowire-containing laminates were all 1% or less, and high transparency could be secured.

Variations in haze of the substrates by the obtained silver nanowire-containing laminates were all 1% or less, and low turbidity could be secured.

Since Comparative Examples 1 and 9 do not contain any of the compound (A) and the compound (B) as the weather resistance improver, it is understood that weather resistance tester photostability, fluorescent photostability and high-temperature/high-humidity stability of the silver nanowire-containing laminate are lower than those of Examples 1 and 2.

Since Comparative Examples 2 to 6 do not contain the compound (A) as the weather resistance improver, it is understood that the fluorescent photostability and the high-temperature/high-humidity stability of the silver nanowire-containing laminate are lower than those of Examples 1 and 2.

Since Comparative Examples 7, 8, 10 and 11 do not contain the compound (B) as the weather resistance improver, it is understood that the fluorescent photostability of the silver nanowire-containing laminate is lower than that of Examples 1 and 2.

Since Examples 3 and 4 contain the compound (A) of 0.3 to 4 mass %, and the compound (B) in a preferable range of 0.03 to 0.6 mmol/g as the amount of phosphorus atom of the atomic group represented by P—OH, with respect to the polymerizable monomers and/or macromonomers, it is understood that the weather resistance tester photostability, the fluorescent photostability and the high-temperature/high-humidity stability of the silver nanowire-containing laminate are higher than those of Examples 1 and 2.

Since Examples 5 and 6 contain the compound (A) of 0.3 to 4 mass %, and the compound (B) in a more preferable range of 0.06 to 0.5 mmol/g as the amount of phosphorus atom of the atomic group represented by P—OH, with respect to the polymerizable monomers and/or macromonomers, it is understood that the weather resistance tester photostability, the fluorescent photostability and the high-temperature/high-humidity stability of the silver nanowire-containing laminate are higher than those of Examples 3 and 4.

Since Examples 7 to 20 contain the compound (A) of 0.5 to 3 mass %, and the compound (B) in a still more preferable range of 0.07 to 0.4 mmol/g as the amount of phosphorus atom of the atomic group represented by P—OH, with respect to the polymerizable monomers and/or macromonomers, it is understood that the weather resistance tester photostability, the fluorescent photostability and the high-temperature/high-humidity stability of the silver nanowire-containing laminate are higher than those of Examples 5 and 6.

Since Examples 21 to 33 contain phosphinic acids as the compound (B), it is understood that the weather resistance tester photostability, the fluorescent photostability and the high-temperature/high-humidity stability of the silver nanowire-containing laminate are higher than those of Examples 5 to 20.

Since Example 34 contains the compound (A) of 0.5 to 3 mass %, and the compound (B) in a more preferable range of 0.06 to 0.5 mmol/g as the amount of phosphorus atom of the atomic group represented by P—OH, with respect to the polymerizable monomers and/or macromonomers, and a neutralization ratio is 80% of atomic groups represented by P—OH, it is understood that the weather resistance tester photostability, the fluorescent photostability and the high-temperature/high-humidity stability of the silver nanowire-containing laminate are higher than those of Comparative Example 1.

Since Example 35 contains the compound (A) of 0.5 to 3 mass %, and the compound (B) in a more preferable range of 0.06 to 0.5 mmol/g as the amount of phosphorus atom of the atomic group represented by P—OH, with respect to the polymerizable monomers and/or macromonomers, and the neutralization ratio is preferable 50% of the atomic groups represented by P—OH, it is understood that the weather resistance tester photostability, the fluorescent photostability and the high-temperature/high-humidity stability of the silver nanowire-containing laminate are higher than those of Example 34.

Since Example 36 contains the compound (A) of 0.5 to 3 mass %, and the compound (B) in a more preferable range of 0.06 to 0.5 mmol/g as the amount of phosphorus atom of the atomic group represented by P—OH, with respect to the polymerizable monomers and/or macromonomers, and the neutralization ratio is more preferable 20% of the atomic groups represented by P—OH, it is understood that the weather resistance tester photostability, the fluorescent photostability and the high-temperature/high-humidity stability of the silver nanowire-containing laminate are higher than those of Example 35.

Since Example 37 contains the compound (A) as the weather resistance improver in the silver nanowire-containing layer, it is understood that the high-temperature/high-humidity stability of the silver nanowire-containing laminate is higher than that of Example 21.

Since Example 38 contains the polyester resin in the silver nanowire-containing layer, it is understood that the high-temperature/high-humidity stability of the silver nanowire-containing laminate is higher than that of Example 21.

In Example 39, since the protective layers of the resin composition for coating the silver nanowire-containing layer are laminated on both sides of the silver nanowire-containing layer, it is understood that the high-temperature/high-humidity stability of the silver nanowire-containing laminate is higher than that of Example 21.

The invention claimed is:

1. A weather resistance improver comprising a compound (A) and a compound (B), wherein
the compound (A) is a compound having the following structure (1), and
the compound (B) is a compound having the following structure (2) or a salt thereof,

[Chemical formula 1]

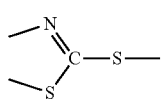

Structure (1)

[Chemical formula 2]

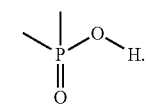

Structure (2)

2. The weather resistance improver according to claim 1, comprising:
the compound (A); and
the compound (B) in which at least one hydroxy group is bonded to one phosphorus atom, wherein
the compound (A) is a compound represented by the following general formula (1) and/or (2), and
the compound (B) is at least one selected from phytic acid, compounds represented by the following general formulas (3), (4), (5) and (6), and salts thereof, General formula (1)

[Chemical formula 3]

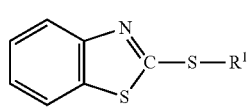

(1)

(where, in the general formula (1), $R^1$ represents a hydrogen atom, an alkyl group of 1 to 8 carbon atoms or a (di) carboxyalkyl group having an alkyl group of 1 to 3 carbon atoms)

General formula (2)

[Chemical formula 4]

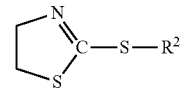

(2)

(where, in the general formula (2), $R^2$ represents a hydrogen atom, an alkyl group of 1 to 8 carbon atoms or a (di) carboxyalkyl group having an alkyl group of 1 to 3 carbon atoms)

General formula (3)

[Chemical formula 5]

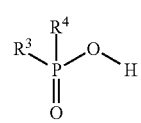

(3)

(where, in the general formula (3), $R^3$ and $R^4$ each represents a hydrogen atom, or an alkyl group, an arylalkyl group, a hydroxyalkyl group, an alkoxyalkyl group, a carboxyalkyl group, an aminoalkyl group, in which an alkyl moiety has 1 to 8 carbon atoms, or an alkenyl group, an aryl group, a hydroxyaryl group or an alkoxyaryl group, and $R^3$ and $R^4$ may be the same or different)

General formula (4)

[Chemical formula 6]

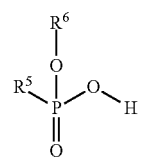

(4)

(where, in the general formula (4), $R^5$ is a hydrogen atom, or an alkyl group, an arylalkyl group, a hydroxyalkyl group, an alkoxyalkyl group, a carboxyalkyl group, an aminoalkyl group, in which an alkyl moiety has 1 to 8 carbon atoms, or a vinyl group, an aryl group, an arylalkenyl group, a hydroxyaryl group, an alkoxyaryl group or a carboxyalkyl group, and $R^6$ represents a hydrogen atom, or an alkyl group, an arylalkyl group, a hydroxyalkyl group, an alkoxyalkyl group, a carboxyalkyl group, an aminoalkyl group, a perfluoroalkyl group, in which an alkyl moiety has 1 to 8 carbon atoms, or an aryl group, a hydroxyaryl group, an alkoxyaryl group or a carboxyaryl group)

General formula (5)

[Chemical formula 7]

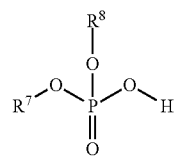
(5)

(where, in the general formula (5), $R^7$ and $R^8$ each represents a hydrogen atom, or an alkyl group, an arylalkyl group, a hydroxyalkyl group, an alkoxyalkyl group, a carboxyalkyl group, an aminoalkyl group, in which an alkyl moiety has 1 to 8 carbon atoms, or an aryl group, a hydroxyaryl group, alkoxyaryl group, carboxyaryl group or (meth)acryloyloxyalkyl group, and $R^7$ and $R^8$ may be the same or different)

General formula (6)

[Chemical formula 8]

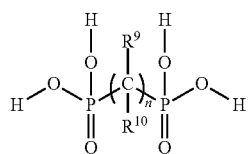
(6)

(where, in the general formula (6), $R^9$ represents a hydrogen atom or a hydroxy group, $R^{10}$ represents a hydrogen atom, an alkyl group or an aminoalkyl group of 1 to 5 carbon atoms, and n represents 1 to 12).

3. The weather resistance improver according to claim 1, wherein the compound (A) is at least one selected from a group consisting of 2-mercaptothiazoline, 3-(2-benzothiazol-2-ylthio)propionic acid, and (1,3-benzothiazol-2-yl-thio) succinic acid.

4. The weather resistance improver according to claim 1, wherein the compound (B) is at least one selected from a group consisting of phosphinic acid, dialkylphosphinic acid having 1 to 8 carbon atoms, (2-carboxyethyl) phenylphosphinic acid, phenylphosphinic acid, diphenylphosphinic acid, bis(4-methoxyphenyl) phosphinic acid, methylphenylphosphinic acid and phenylvinylphosphinic acid.

5. A resin composition for coating a silver nanowire-containing layer, comprising the weather resistance improver according to claim 1, a photopolymerization initiator and/or a thermal polymerization initiator, and polymerizable monomers and/or macromonomers.

6. The resin composition for coating the silver nanowire-containing layer according to claim 5, comprising at least one compound (A) of 0.3 to 4 mass %, and at least one compound (B) of 0.03 to 0.6 mmol/g as an amount of phosphorus atom with respect to the polymerizable monomers and/or macromonomers.

7. A silver nanowire-containing laminate comprising: a silver nanowire-containing layer; and a protective layer disposed on the silver nanowire-containing layer and for protecting the silver nanowire-containing layer, wherein
the weather resistance improver according to claim 1 is contained only in the protective layer, or in both the protective layer and the silver nanowire-containing layer, and
the protective layer is a cured product of a resin composition for coating the silver nanowire-containing layer, which further satisfies the following conditions:
(1) containing a photopolymerization initiator and/or a thermal polymerization initiator, and polymerizable monomers and/or macromonomers;
(2) containing at least one compound (A) of 0.3 to 4 mass % with respect to the polymerizable monomers and/or macromonomers; and
(3) containing at least one compound (B) of 0.03 to 0.6 mmol/g as an amount of phosphorus atom with respect to the polymerizable monomers and/or macromonomers.

8. The silver nanowire-containing laminate according to claim 7, wherein the silver nanowire-containing layer comprises a polyester resin dissolved or dispersed in an aqueous solvent or an aqueous dispersion medium.

9. The weather resistance improver according to claim 1, wherein
the compound (A) is at least one selected from a group consisting of 2-mercaptothiazoline, 2-mercaptobenzothiazole, 3-(1,3-benzothiazol-2-ylthio) propionic acid and (1,3-benzothiazol-2-ylthio) succinic acid, and
the compound (B) is at least one selected from a group consisting of phytic acid, phosphoric acid, dibutyl phosphate, 2-(acryloyloxy)ethyl phosphate, bis[2-(methacryloyloxy) ethyl]phosphate, acid phosphoxy polyethylene glycol mono(meth)acrylate, acid phosphoxy polypropylene glycol mono(meth)acrylate, phosphonic acid, octylphosphonic acid, phenylphosphonic acid, vinylphosphonic acid, 6-phosphonohexanoic acid, (12-phosphonododecyl) phosphonic acid, etidronic acid, phosphinic acid, dimethylphosphinic acid, diisooctylphosphinic acid, phenylphosphinic acid, diphenylphosphinic acid, (2-carboxyethyl) phenylphosphinic acid, bis(4-methoxyphenyl) phosphinic acid, bis(hydroxymethyl) phosphinic acid, methylphenylphosphinic acid and phenylvinylphosphinic acid.

10. The weather resistance improver according to claim 9, wherein
the compound (A) is 2-mercaptothiazoline.

11. The weather resistance improver according to claim 9, wherein the compound (B) is at least one selected from a group consisting of phosphinic acid, dimethylphosphinic acid, diisooctylphosphinic acid, phenylphosphinic acid, diphenylphosphinic acid, (2-carboxyethyl) phenylphosphinic acid, bis(4-methoxyphenyl) phosphinic acid, bis(hydroxymethyl) phosphinic acid, methylphenylphosphinic acid and phenylvinylphosphinic acid.

12. A silver nanowire-containing laminate comprising: a silver nanowire-containing layer; and a protective layer disposed on the silver nanowire-containing layer and for protecting the silver nanowire-containing layer, wherein
the weather resistance improver according to claim 11 is contained only in the protective layer, or in both the protective layer and the silver nanowire-containing layer, and
the protective layer is a cured product of a resin composition for coating the silver nanowire-containing layer, which further satisfies the following conditions:
(1) containing a photopolymerization initiator and/or a thermal polymerization initiator, and polymerizable monomers and/or macromonomers;
(2) containing at least one compound (A) of 0.3 to 4 mass % with respect to the polymerizable monomers and/or macromonomers; and (3) containing at least one compound (B) of 0.03 to 0.6 mmol/g as an amount of phosphorus atom with respect to the polymerizable monomers and/or macromonomers.

13. A silver nanowire-containing laminate comprising: a silver nanowire-containing layer; and a protective layer disposed on the silver nanowire-containing layer and for protecting the silver nanowire-containing layer, wherein the weather resistance improver according to claim 10 is contained only in the protective layer, or in both the protective layer and the silver nanowire-containing layer, and the protective layer is a cured product of a resin composition for coating the silver nanowire-containing layer, which further satisfies the following conditions:

(1) containing a photopolymerization initiator and/or a thermal polymerization initiator, and polymerizable monomers and/or macromonomers;

(2) containing at least one compound (A) of 0.3 to 4 mass % with respect to the polymerizable monomers and/or macromonomers; and (3) containing at least one compound (B) of 0.03 to 0.6 mmol/g as an amount of phosphorus atom with respect to the polymerizable monomers and/or macromonomers.

14. A silver nanowire-containing laminate comprising: a silver nanowire-containing layer; and a protective layer disposed on the silver nanowire-containing layer and for protecting the silver nanowire-containing layer, wherein the weather resistance improver according to claim 11 is contained only in the protective layer, or in both the protective layer and the silver nanowire-containing layer, and the protective layer is a cured product of a resin composition for coating the silver nanowire-containing layer, which further satisfies the following conditions:

(1) containing a photopolymerization initiator and/or a thermal polymerization initiator, and polymerizable monomers and/or macromonomers;

(2) containing at least one compound (A) of 0.3 to 4 mass % with respect to the polymerizable monomers and/or macromonomers; and (3) containing at least one compound (B) of 0.03 to 0.6 mmol/g as an amount of phosphorus atom with respect to the polymerizable monomers and/or macromonomers.

15. The silver nanowire-containing laminate according to claim 12, wherein the resin composition for coating the silver nanowire-containing layer contains at least one compound (A) of 0.5 to 3 mass % with respect to the polymerizable monomers and/or macromonomers, and contains at least one compound (B) of 0.06 to 0.5 mmol/g as an amount of phosphorus atom with respect to the polymerizable monomers and/or macromonomers.

16. The silver nanowire-containing laminate according to claim 12, wherein the resin composition for coating the silver nanowire-containing layer contains at least one compound (A) of 0.5 to 3 mass % with respect to the polymerizable monomers and/or macromonomers, and contains at least one compound (B) of 0.07 to 0.4 mmol/g as an amount of phosphorus atom with respect to the polymerizable monomers and/or macromonomers.

17. The silver nanowire-containing laminate according to claim 1, wherein a neutralization ratio of the compound (B) is 80% or less based on atomic groups represented by P—OH.

18. The silver nanowire-containing laminate according to claim 1, wherein a neutralization ratio of the compound (B) is 50% or less based on atomic groups represented by P—OH.

19. The silver nanowire-containing laminate according to claim 1, wherein a neutralization ratio of the compound (B) is 20% or less based on atomic groups represented by P—OH.

20. The silver nanowire-containing laminate according to claim 14, wherein the silver nanowire-containing layer contains the compound (A).

* * * * *